(12) United States Patent
Nakabayashi et al.

(10) Patent No.: US 7,490,890 B2
(45) Date of Patent: Feb. 17, 2009

(54) VEHICLE

(75) Inventors: Shunichi Nakabayashi, Saitama (JP); Tomokatsu Suda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/798,604

(22) Filed: May 15, 2007

(65) Prior Publication Data

US 2007/0216188 A1 Sep. 20, 2007

Related U.S. Application Data

(62) Division of application No. 10/947,194, filed on Sep. 23, 2004, now Pat. No. 7,243,750.

(30) Foreign Application Priority Data

Oct. 10, 2003 (JP) ............................. 2003-352953
Oct. 10, 2003 (JP) ............................. 2003-352987

(51) Int. Cl.
B60N 3/06 (2006.01)
(52) U.S. Cl. ......................................................... 296/75
(58) Field of Classification Search .................. 296/75
See application file for complete search history.

(56) References Cited

U.S. PATENT DOCUMENTS

| | | | |
|---|---|---|---|
| 3,898,950 A * | 8/1975 | Martin ........................ 440/105 |
| 4,678,223 A | 7/1987 | Kishi et al. | |
| 4,728,121 A * | 3/1988 | Graves ......................... 296/75 |
| 4,818,012 A | 4/1989 | Kohama et al. | |
| 4,830,135 A | 5/1989 | Yamashita | |
| 4,911,494 A | 3/1990 | Imai et al. | |
| 4,913,256 A | 4/1990 | Sakuma | |
| 5,183,130 A | 2/1993 | Nakamura et al. | |
| 6,651,769 B2 | 11/2003 | Laivins et al. | |
| 6,695,088 B2 | 2/2004 | Schroeder | |
| 7,062,990 B2 * | 6/2006 | Kato ........................... 296/75 |

FOREIGN PATENT DOCUMENTS

| JP | 11-227659 A | 8/1999 |
|---|---|---|
| JP | 3340637 B2 | 8/2002 |

* cited by examiner

*Primary Examiner*—Lori L Lyjak
(74) *Attorney, Agent, or Firm*—Birch, Stewart, Kolasch & Birch, LLP

(57) ABSTRACT

A vehicle having a side cover capable of sending a sufficient amount of cooling air to a radiator even without a front cover or cowling. Side covers are disposed on both right and left side surfaces for covering a radiator. An air admission portion for drawing in a cooling air for cooling the radiator is provided in each of the side covers. A main step is disposed outside of each of the air admission portions with a footpeg portion provided on a top surface thereof and a step portion projecting upwardly at a front end portion thereof. The step portion is substantially at the same position in the fore-aft direction of the vehicle as a front end of the air admission portion. The footpeg surfaces is located near a rear portion of a front wheel with the main step structure ensuring an even more comfortable and easy riding position.

19 Claims, 25 Drawing Sheets

VEHICLE

CROSS-REFERENCE TO RELATED APPLICATIONS

The present application is a Divisional of U.S. application Ser. No. 10/947,194, filed on Sep. 23, 2004 now U.S. Pat. No. 7,243,750, and claims priority under 35 USC 119 to Japanese Patent Application Nos. 2003-352987 and 2003-352953 both filed on Oct. 10, 2003 the entire contents of which are hereby incorporated by reference.

BACKGROUND OF THE INVENTION

1. Field of the Invention

The present invention relates to a vehicle having side covers on both the right and left-hand side surfaces of a body thereof for covering a radiator and to vehicle main steps provided with footpeg surfaces on both sides of a vehicle at a location near a rear portion of a front wheel.

2. Description of Background Art

A vehicle is known, wherein a floor skirt is attached to a footpeg portion and a closed section is formed by vehicle body covers including the floor skirt. See, for example, Japanese Patent No. 3340637 (FIG. 8).

The arrangement disclosed in Japanese Patent No. 3340637 will be described with reference to FIG. 10 which is an explanatory view showing the basic configuration of the prior art arrangement. A floor skirt 324 extends downwardly from an outer edge of a footpeg board 323. The right and left floor skirts 324 are connected with an undercover 325 to form a closed section 384.

Air Fc is admitted through a radiator wind admission portion provided on a front surface of a front cover and flows through the closed section 384 formed by the footpeg boards 323, the floor skirts 324, the undercover 325 and the like as follows. More specifically, the air Fc mainly flows from forward to rearward at a portion disposed downwardly of the footpeg boards 323 toward the radiator. A fuel tank 308 is provided together with a reservoir tank 309, a center cover 326, a main pipe 361, a down tube 362 and a cross pipe 364.

The recent trend in popular motorcycles is to provide a simple structure having a smaller number of vehicle body covers. There is a need for an even more ingenious idea for the introduction of a cooling air in a side cover if the motorcycle is built without any front cover or cowling.

Vehicle main steps have conventionally been disposed at many different locations. Some are located near a front wheel of the vehicle. Others are located near a rear wheel of the vehicle. Still others may be located at a mid-point between the front and rear wheels of the vehicle.

In the type of main steps disposed near the front wheel of the vehicle, a main step mounting structure taking into account assemblability to a vehicle body frame is known. See, for example, Japanese Patent Laid-open No. Hei 11-227659 (FIG. 4).

The structure disclosed in Japanese Patent Laid-open No. Hei 11-227659 (FIG. 4) will be described with reference to FIG. 25.

FIG. 25 is an explanatory view showing the basic construction of the conventional structure. A main step bracket 1344 includes a vehicle width direction extension portion 1344a and a vehicle body rearward extension portion 1344b. A center portion of the main step bracket 1344 is attached via a first fixing member 1319 to a down tube 1313. The vehicle width direction extension portion 1344a then extends crosswise relative to a fore-aft direction of the vehicle. The vehicle body rearward extension portion 1344b then extends rearwardly from both ends of the vehicle width direction extension portion 1344a. The vehicle body rearward extension portion 1344b is then attached to a main pipe 1312 via a second fixing member 1316.

Main steps 1303 are then attached by way of right and left step connecting members 1351, 1352 to the vehicle width direction extension portion 1344a of the main step bracket 1344.

The position at which the main steps 1303 are disposed is at the front and below an engine. In some types of vehicles, such as a scooter type vehicle, the distance in the vertical direction between a rider's seat and the main steps 1303 is short. In addition, the distance in the fore-aft direction between the rider's seat and the main steps 1303 is long. In such a type of vehicle, the back surface of the feet placed on the main steps 1303 tends to be inclined upwardly at its front. Consideration should therefore be given to timing, at which the rider plants his or her feet on the main steps 1303.

Thus, it is necessary to take into consideration the timing, at which the rider plants his or her feet on the main steps 1303 because of the inclination involved of the back surface of his or her feet tending to be upward at its front. At the same time, a comfortable riding position must be ensured. It is even more preferable to provide a disposition and structure of the main steps 1303 meeting these requirements.

SUMMARY AND OBJECTS OF THE INVENTION

An object of the present invention is to provide a vehicle having a side cover capable of sending a sufficient amount of cooling air to a radiator even without any front cover or cowling fitted therewith.

The present invention applies to a vehicle not provided with cowlings on either a right or left side of a front fork and including side covers disposed on both right and left side surfaces of a body thereof for covering a radiator provided in the vehicle body. The present invention includes an air admission portion for drawing in cooling air for cooling the radiator that is provided in each of the side covers. A main step, on which a rider places his or her foot, is disposed outside of each of the air admission portions.

The present invention includes a main step that overlaps the air admission portion in a top view.

The present invention provides the air admission portion protruding outwardly in the direction of the width of the vehicle and facing forward of the vehicle.

The present invention provides a guide member for guiding the cooling air drawn in through the air admission portion toward the radiator that is formed integrally with the side cover.

The present invention provides an air exhaust port for exhausting air after cooling that is provided in the side cover at a position rearward from the radiator in a side view.

The present invention provides that the air admission portion protrudes outwardly in the direction of the vehicle width such that part thereof overlaps the main step in a plan view.

The present invention provides a side cover that includes a side stand cover portion for covering at least part of a side stand provided for the vehicle.

The present invention provides the side cover that further includes an exhaust pipe cover portion for covering at least part of an exhaust pipe extending from an engine provided for the vehicle.

The present invention provides the main step includes a footpeg portion provided on a top surface thereof and a step portion protruding upwardly at a front end portion thereof. The step portion is substantially at the same position in the fore-aft direction of the vehicle as that of a front end of the air admission portion.

In accordance with the present invention, the air admission portion for drawing in the cooling air for cooling the radiator is provided in the side cover. The main step, on which the rider places his or her foot, is disposed outside of the air admission portion.

Thus, the present invention has the benefit of increasing the degree of freedom in design of the part under the main step, since the cooling air passes the inwardly from the main step in the direction of vehicle width.

In accordance with the present invention, the main step overlaps the air admission portion in the top view. Thus, the invention has the benefit of enhancing the air admission effect or allowing the main steps to be brought closer together in the direction of vehicle width.

In accordance with the present invention, the air admission portion protrudes outwardly in the direction of vehicle width and faces forward the vehicle. Thus, the invention has the benefit of securing a reasonably sufficient amount of cooling air drawn in.

In accordance with the present invention, the guide member for guiding the cooling air drawn in through the air admission portion toward the radiator is formed integrally with the side cover. The present invention thus has the benefit of sending the cooling air effectively to the radiator.

In accordance with the present invention, the air exhaust port for exhausting air after cooling is provided integrally in the side cover at the position rearwardly from the radiator in a side view. The present invention thus has the benefit of reducing the number of parts used.

In accordance with the present invention, the air admission portion protrudes outwardly in the direction of vehicle width such that part thereof overlaps the main step in a plan view. Thus, the present invention has the benefit of increasing the volume inside the side cover and thus gaining a greater volume of cooling air.

In accordance with the present invention, the side cover includes the side stand cover portion for covering at least part of the side stand provided for the vehicle. Thus, the present invention has the benefit of requiring no extra parts for covering the side stand, thus eliminating the chance of increasing the number of parts used.

In accordance with the present invention, the side cover further includes the exhaust pipe cover portion for covering at least part of the exhaust pipe extending from the engine provided for the vehicle. Thus, the present invention has the benefit of requiring no extra parts for covering the exhaust pipe, thus eliminating the chance of increasing the number of parts used.

In accordance with the present invention, the main step includes the footpeg portion provided on the top surface thereof and the step portion protruding upwardly at the front end portion thereof. The step portion is substantially at the same position in the fore-aft direction of the vehicle as that of the front end of the air admission portion. Thus, the present invention has the benefit of eliminating the chance of the foot reaching a point forward from the step portion, thereby allowing nothing to interfere with air admission.

An object of the present invention is to provide, in a vehicle provided with footpeg surfaces on both sides thereof at a location near a rear portion of a front wheel, a vehicle main step structure ensuring an even more comfortable and easy riding position.

The present invention is applied to a vehicle having no leg shields and having footpeg surfaces on both sides thereof at the location near the rear portion of the front wheel. This vehicle includes main steps disposed in such a manner that the legs of the rider with feet placed on the footpegs form an obtuse angle of more than 90° at their knees. The present invention includes a front end portion of each of the main steps that is provided with a step protruding upwardly.

In the present invention the main step is an inclined step having a front portion raised from the level of a rear portion on the footpeg surface.

In the present invention a rider's seat is slidable in a fore-aft direction of the vehicle.

In the present invention the main step is shaped to be symmetrical about a centerline thereof. The invention includes the footpeg surface that is shaped like a trapezoid with a wider front portion and a narrower rear portion.

The present invention provides the main step that is formed by placing a plastic cover over a bracket extending from a vehicle body frame.

The present invention includes the footpeg surface of the main step that is inclined in such a manner that an extension from the footpeg surface runs a level equivalent to or higher than generally a half of the height between a lower end portion of a head pipe serving as a steering axis and a center of the front wheel.

In accordance with the present invention, the front end portion of each of the main steps is provided with a step protruding upwardly. The rider then can place part of his or her feet, such as the tip of the toes or the like, on these protruded steps, which allow the rider to change his or her riding position during long hours of riding. Thus, the invention has the benefit of allowing the rider to take an easy riding position.

In accordance with the present invention, the main step is an inclined step having the front portion raised from the level of the rear portion on the footpeg surface. Thus, the invention has the benefit of allowing the rider to take an even more comfortable riding position.

In accordance with the present invention, the rider's seat is slidable in the fore-aft direction of the vehicle. Thus, the invention has the benefit of allowing the rider to select an optimum seat position according to his or her build or the like.

In accordance the present invention, the main step is shaped to be symmetrical about the centerline thereof, and the footpeg surface is shaped like a trapezoid with a wider front portion and a narrower rear portion. Thus, the invention has the benefits of standardizing the right and left steps, while, at the same time, saving extra footpeg surfaces.

In accordance with the present invention, the main step is formed by placing the plastic cover over the bracket extending from the vehicle body frame. Thus, the invention has the benefit of enhancing the aesthetic appearance of the main steps and surrounding parts.

In accordance with the present invention, the footpeg surface of the main step is inclined in such a manner that an extension from the footpeg surface runs a level equivalent to or higher than generally a half of the height between the lower end portion of the head pipe serving as the steering axis and the center of the front wheel. Thus, the invention has the benefit of allowing the rider to take a comfortable position particularly in a vehicle having a small-diameter front wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode for carrying out the present invention will be described with reference to the accompanying drawings.

Figure 1:
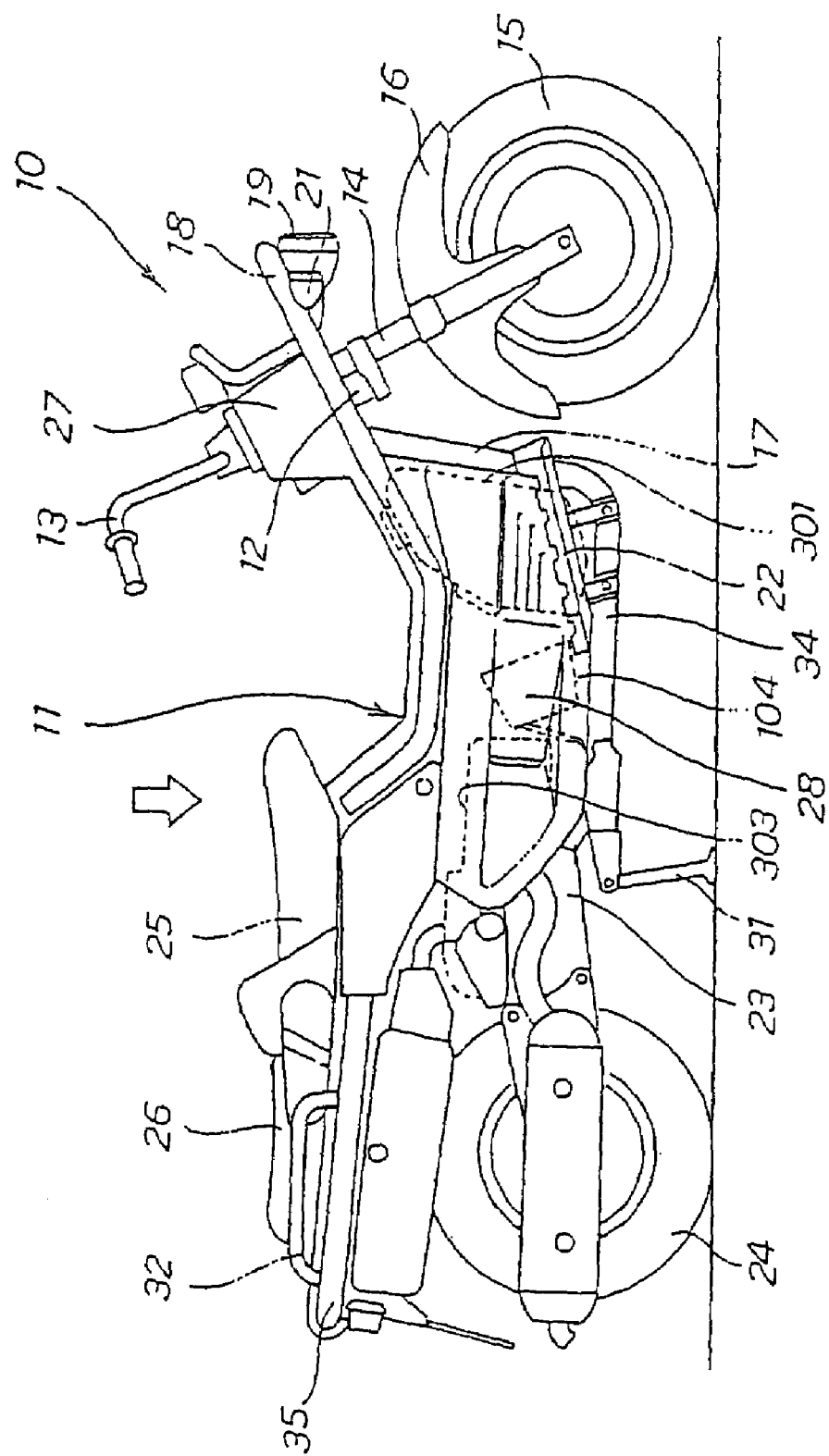
FIG. 1 is a side elevational view showing a scooter type vehicle according to the embodiment of the present invention.

FIG. 1 is a side elevational view showing a scooter type vehicle according to an embodiment of the present invention. A scooter type vehicle 10 is basically constructed as follows. Specifically, a steering handlebar 13 is steerably mounted to a head pipe 12 at a front portion of a vehicle body frame 11. A front wheel 15 and a front fender 16 are mounted to a front fork 14 connected to the steering handlebar 13.

A separate frame 18 is mounted on the vehicle body frame 11. A headlamp 19, a turn signal lamp 21 and the like are attached to the separate frame 18. A main step 22 is attached to a down tube 17. A power unit 23 is vertically swingably mounted to a rear portion of the vehicle body frame 11. A rear wheel 24 is mounted at a rear portion of the power unit 23. A rider's seat 25 is provided obliquely upwardly and forwardly of the rear wheel 24 and a rear seat combined with a seat back 26 is provided upwardly of the rear wheel 24. The scooter type vehicle 10 constructed as described above is a two-seater light vehicle.

Referring to FIG. 1, a steering handlebar post cover 27 is provided together with a side cover 28, a stand 31, a grab rail 32, a radiator 104, a fuel tank 301 and an engine 303.

The scooter type vehicle according to the embodiment of the present invention provides not only the steering handlebar 13 and the grab rail 32, but also the separate frame 18, the down tube 17, a lower pipe 34 extending from the down tube 17 and a rear frame 35 that are all exposed.

In the conventional scooter type vehicle, it is common practice to cover the vehicle body frame with a vehicle body cover to ensure that most of the vehicle body frame is not exposed. According to the present invention, on the other hand, a good part of the vehicle body frame is exposed to exhibit a completely new appearance feature.

Figure 2:
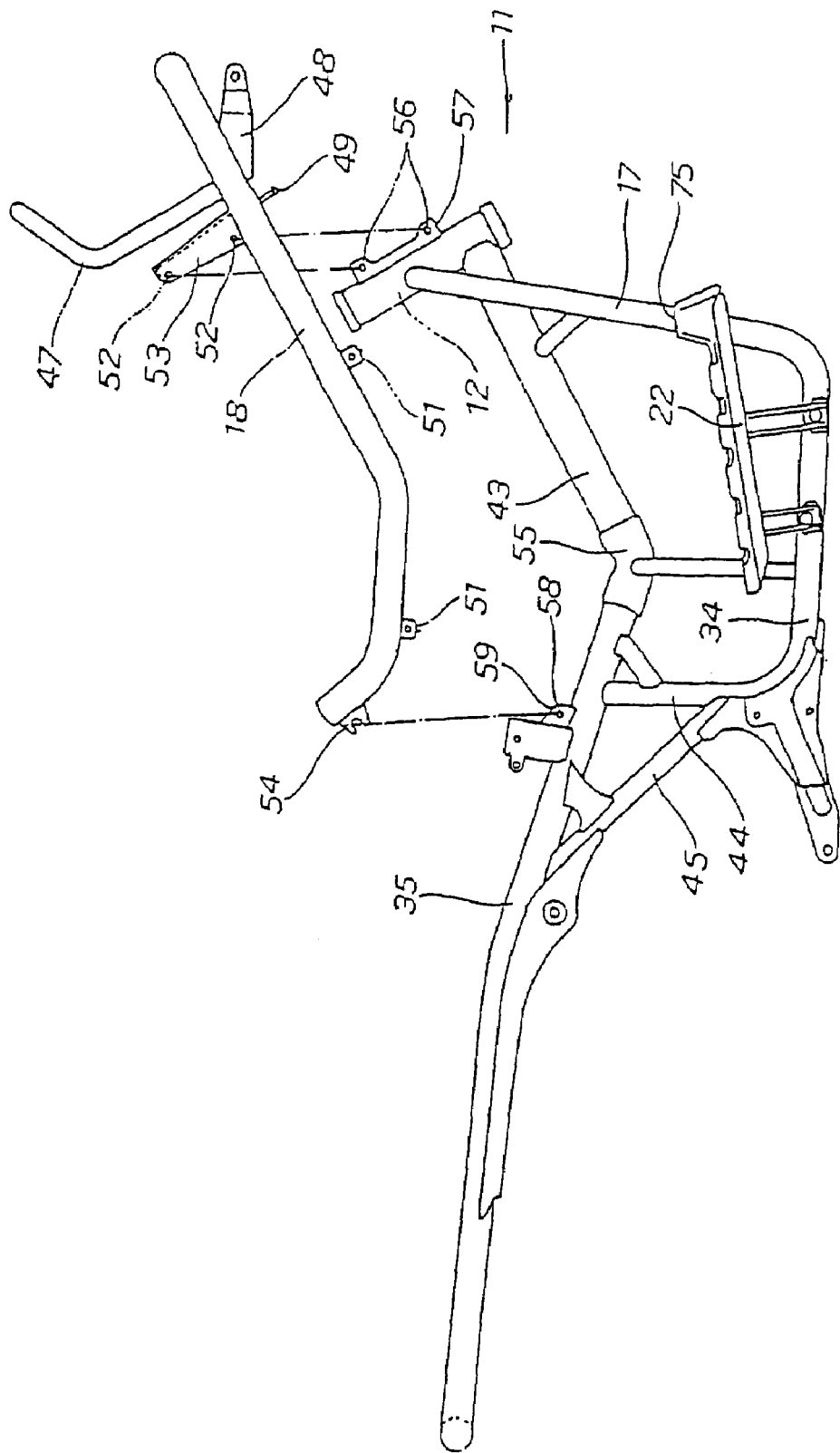
FIG. 2 is an exploded view showing the vehicle body frame of the scooter type vehicle according to the embodiment of the present invention.

FIG. 2 is an exploded view showing the vehicle body frame of the scooter type vehicle according to an embodiment of the present invention. The vehicle body frame 11 includes a main frame 43 extending from the head pipe 12 and being V-shaped or U-shaped as viewed from a side with the rear frame 35 forming a rear portion of the main frame 43 or extending the main frame 43 rearwardly. The down tube 17 drops downwardly from the head pipe 12 with the lower pipe 34 extending substantially horizontally from the down tube 17. A center frame 44 rises upwardly from a rear end of the lower pipe 34 and a stay 45 connects the center frame 44 with the rear frame 35.

Referring to FIG. 2, the frame is of a simple shape and is shown separated upwardly as the separate frame 18.

The separate frame 18 is provided with a cargo receiving pipe 47 on the top surface at the front portion thereof. A lamp support bracket 48 and a cargo strap hook 49 are provided on the bottom at the front thereof. The separate frame 18 further includes cover fixing plates 51, 51 on the bottom surface thereof. The separate frame 18 still further includes a bracket 53 having holes 52 therein on the top surface at the front portion thereof and U-shaped brackets 54 on the bottom surface in the rear portion thereof.

A front portion plate 57 having holes 56, 56 therein is provided on the front surface of the head pipe 12. A rear portion plate 59 having a hole 58 therein is provided on the top surface at the front portion of the rear frame 35.

The rear portion plate 59 is disposed at a position near a connection 55 between the main frame 43 and the rear frame 35. The connection 55 is a portion, at which one main frame 43 meets two rear frames 35. The connection 55 has a high rigidity. If the rear portion plate 59 is provided at a position near (rearward according the embodiment of the present invention) this highly rigid connection 55, it is advantageous in terms of strength in supporting the separate frame 18.

The bracket 53 is bolted to the front portion plate 57. The U-shaped bracket 54 is bolted to the rear portion plate 59. The separate frame 18 can thereby be integrated with the head pipe 12 and the main frame 43. The configuration after the integrating procedure will be described as follows.

Figure 3:
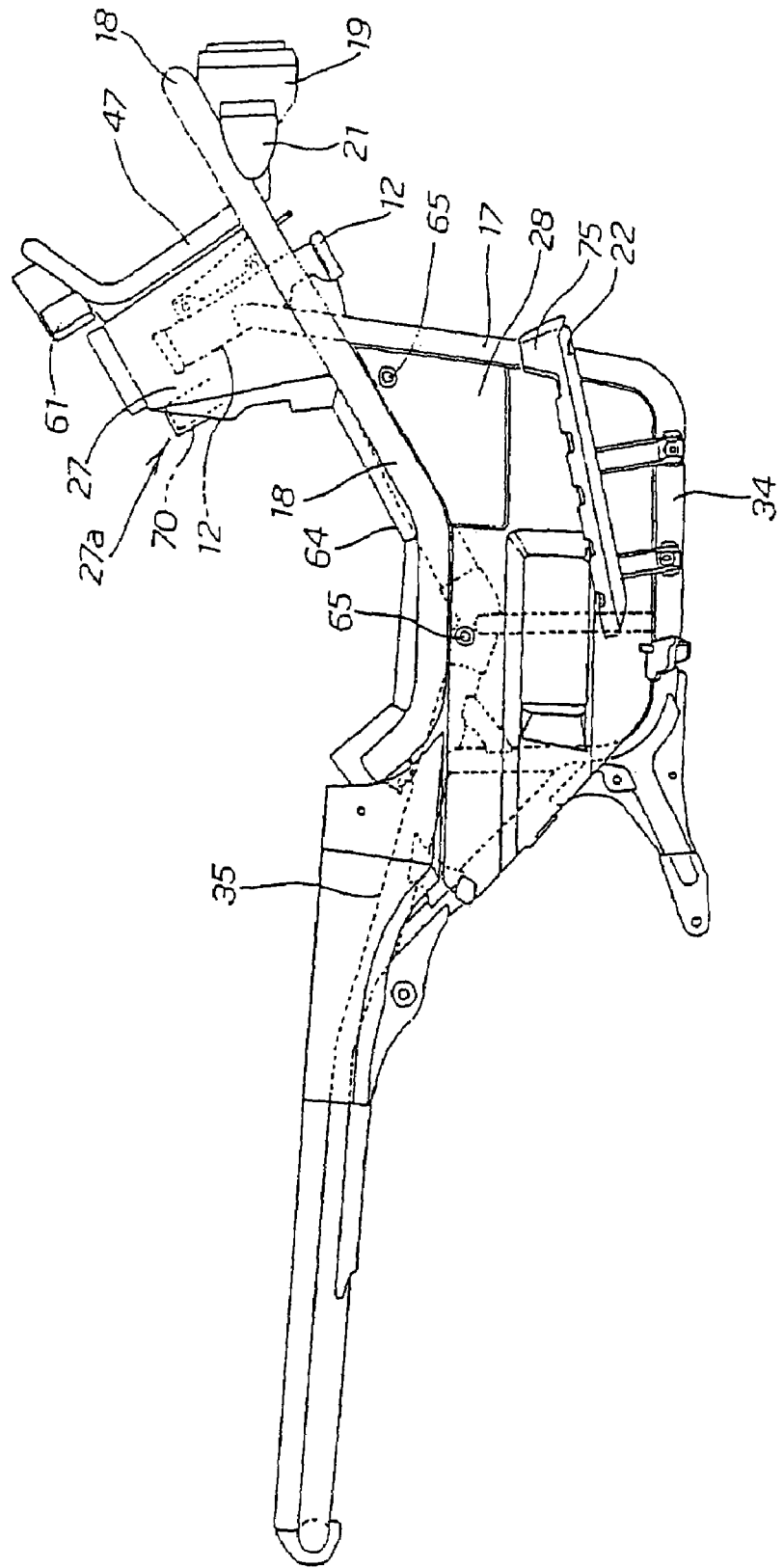
FIG. 3 is a side elevational view showing the vehicle body frame of the scooter type vehicle according to the embodiment of the present invention.

FIG. 3 is a side elevational view showing the vehicle body frame of the scooter type vehicle according to the embodiment of the present invention. FIG. 3 illustrates the separate frame 18 that is mounted to the head pipe 12 and the rear frame 35. A center cover portion 64, integrally including the steering handlebar post cover 27, is then placed thereon. The side cover 28 is attached between the separate frame 18 and the lower pipe 34 using bolts 65 . . . . The main step 22 is then mounted to the lower pipe 34.

As shown in FIG. 3, the front surface of the steering handlebar post cover 27 is formed into a flat surface to provide an ample cargo space at the front thereof.

A shelf portion 27a is formed in the rear at an upper portion of the steering handlebar post cover 27. The shelf portion 27a is one step down from the steering handlebar post cover 27. A combination lock device 70 is attached to the shelf portion 27a.

Figure 4:
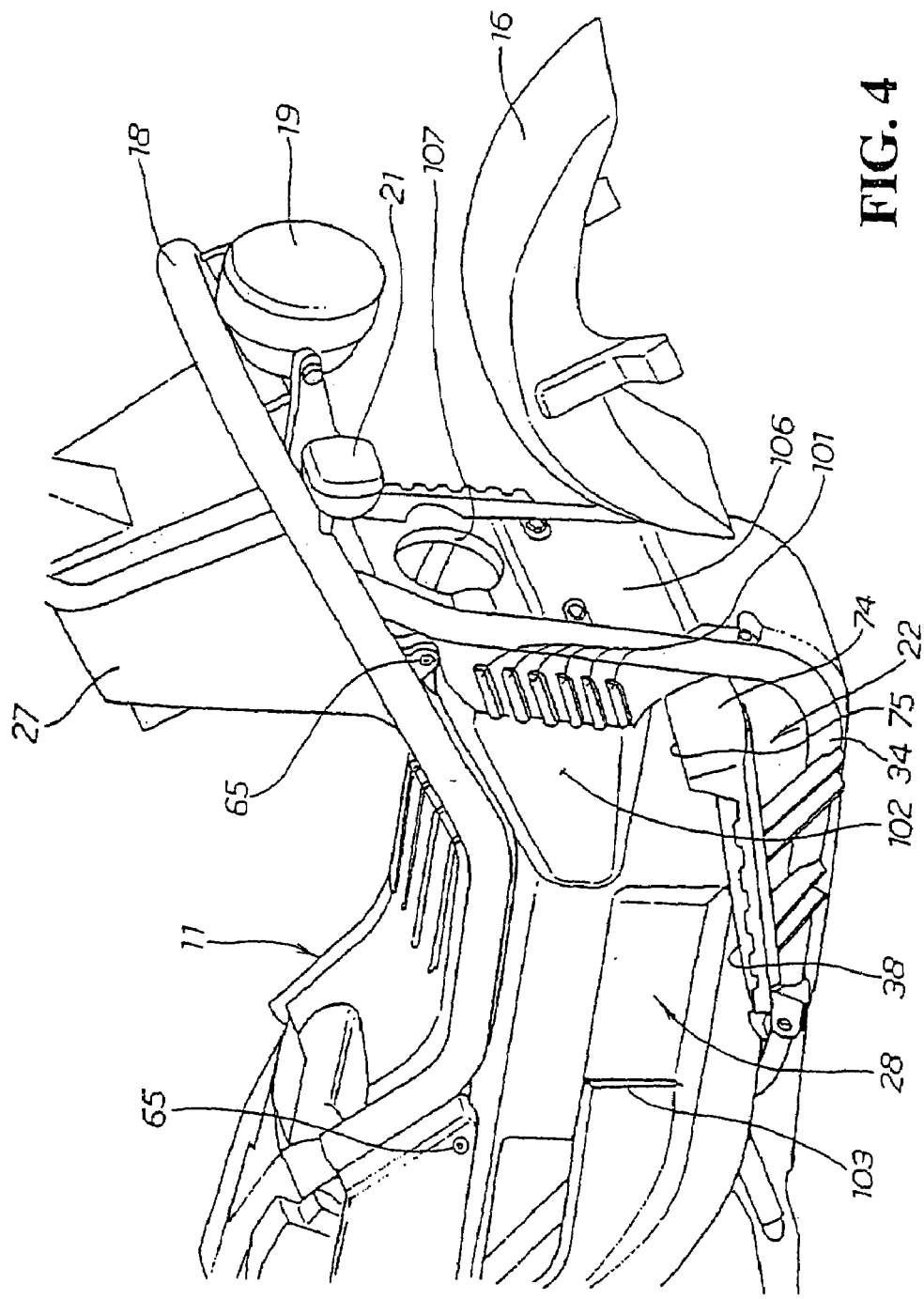
FIG. 4 is a perspective view showing the side cover according to the embodiment of the present invention.

FIG. 4 is a perspective view showing the side cover according to the embodiment of the present invention. FIG. 4 describes the shape of the side cover 28, with the front fork, the front wheel, the handlebar, a horn and the rider's seat being omitted. Two side covers 28 are provided, one for the right-hand side and the other for the left-hand side. The side cover 28 is formed to be symmetrical about the centerline in the vehicle operating direction. The side cover 28 on the right-hand side will be representatively described as follows.

The side cover 28 is a thin sheet member including an air admission window 101, an air admission portion 102 and an air exhaust port 103, arranged from forward to rearward. The air admission window 101 includes a plurality of slit-like holes provided on a front surface portion of the side cover 28. The air admission portion 102 is formed to protrude sideways including the air admission window 101. The air exhaust port 103 is provided at substantially a middle portion rearwardly.

The main step 22 includes a footpeg surface 38 provided on a top surface thereof. The main step 22 further includes a step portion 75 protruding upwardly and provided on a front end portion 74 thereof.

The side covers 28 are attached between the separate frame 18 and the lower pipe 34 using bolts 65 . . . . The main steps 22 are mounted to the lower pipes 34.

A front lower cover 106 formed on the front surface portion of the vehicle is a substantially flat sheet. Because of its flat shape, the front lower cover 106 can be easily formed. The front lower cover 106 can be easily formed through, for example, resin molding using a resin material or presswork-ing using a ferrous, aluminum, or other metal thin sheet material.

In addition, a cutout 107 for the horn is provided at an upper portion in the middle of the front lower cover 106. The horn cutout 107 is provided to allow the front lower cover 106 to be disposed substantially flush with the horn. The arrangement, in which the front lower cover 106 is disposed substantially flush with the horn, makes the appearance around the front lower cover 106 look good.

Figure 5:
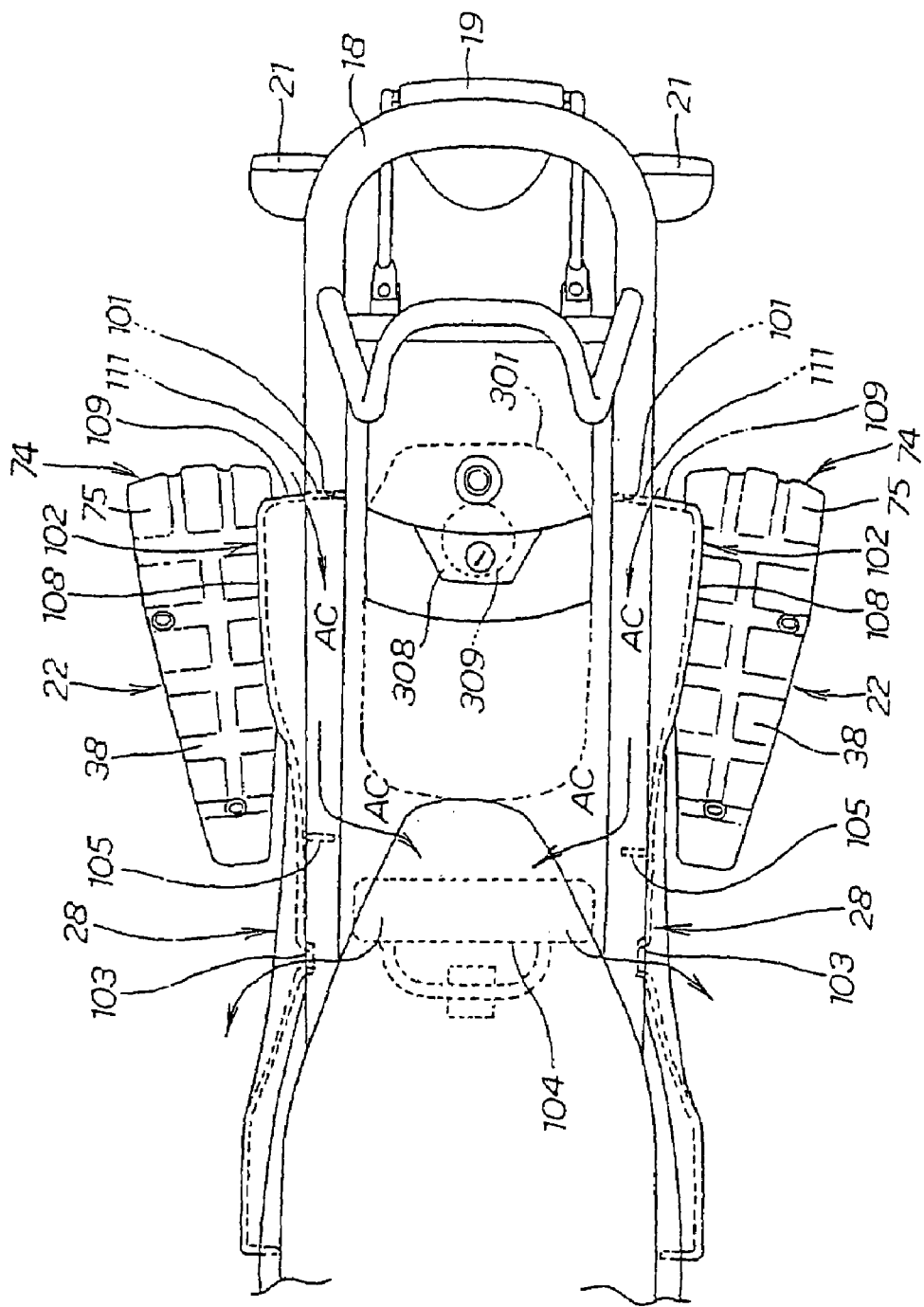
FIG. 5 is a plan view showing the side covers according to the embodiment of the present invention.

FIG. 5 is a plan view showing the side covers according to the embodiment of the present invention. FIG. 5 shows that a guide member 105 for guiding a cooling air AC drawn in through the air admission portion 102 toward the radiator 104 is formed integrally with the side cover 28. A fuel lid 308 and a fuel cap 309 are mounted on the fuel tank 301.

Since the guide member 105 for efficiently guiding the cooling air AC to the radiator 104 is integrally formed with the side cover 28, the cooling air AC can be efficiently sent to the radiator 104.

According to the embodiment of the present invention, the air admission window 101 forming part of the air admission portion 102 is formed at a front surface portion 109 of the vehicle body. The air admission window 101 may nonetheless be additionally formed in a side surface portion 108 of the vehicle body.

Forming the air admission window 101 both in the front surface portion 109 and the side surface portion 108 allows an even greater amount of the cooling air AC to be taken in for the radiator 104.

The air exhaust port 103 for exhausting air after cooling is integrally formed with the side cover 28 at a position rearward of the radiator 104. This allows the air after cooling from the radiator 104 to be smoothly exhausted to an outside. The number of parts used can also be reduced.

Moreover, the air admission portion 102 projects outwardly in the direction of vehicle width such that part thereof overlaps the main step 22 in a plan view. This increases the volume inside the side cover 28 and gains the volume of the cooling air AC.

In addition, the main step 22 includes the footpeg surface 38 disposed on the top surface thereof and the step portion 75 projecting upwardly and provided on the front end portion 74 thereof. In this main step 22, the step portion 75 of the main step 22 is substantially at the same position in the fore-aft direction of the vehicle as that of a front end 111 of the air admission portion 102.

This arrangement, in which the step portion 75 is substantially aligned with the front end 111 of the air admission portion 102 in the fore-aft direction of the vehicle, eliminates the chance of the foot reaching a point forward of the step portion 75. This in turn allows nothing to interfere with air admission.

In addition, the main step 22 overlaps the air admission portion 102 in the top view. Thus, the air admission effect can be enhanced. Or the main steps 22 can be brought closer together in the direction of vehicle width.

Figure 6:
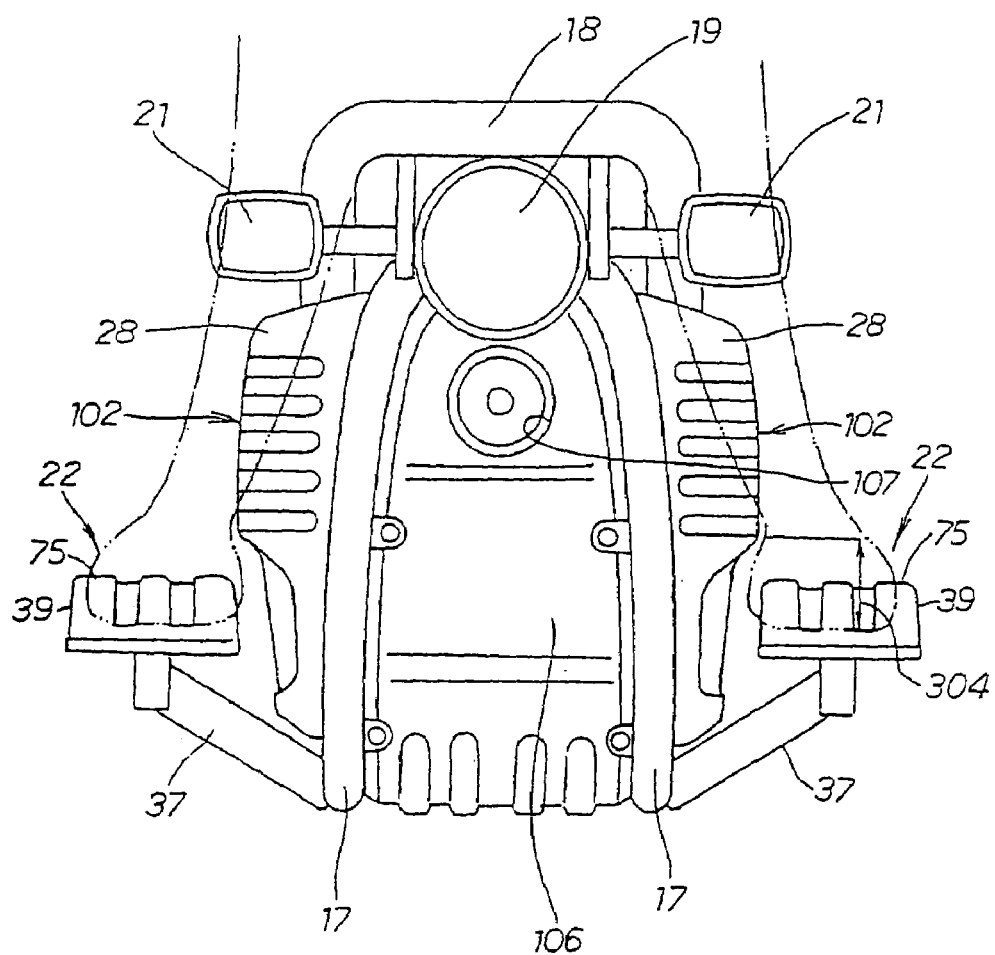
FIG. 6 is a front view showing the side covers according to the embodiment of the present invention.

FIG. 6 is a front view showing the side covers 28 according to the embodiment of the present invention. The vehicle, to which the invention is applied, has side covers 28 on both sides of the body thereof for covering the radiator 104 (see FIG. 5) provided therein. FIG. 6 shows that, in this vehicle, the air admission portions 102 for drawing in the cooling air for cooling the radiator 104 (see FIG. 5) are provided in the side covers 28. FIG. 6 further shows that the main steps 22, on which the rider places his or her feet, are disposed outside the air admission portions 102.

A distance 304 between the lower end of the air admission portion 102 and a seating surface of the main step 22 is to be set so as to be the height of the instep or more.

The side covers 28 are narrowed down at areas near an ankle. This means that the side covers 28 do not interfere with the air admission portions 102.

Figure 7:
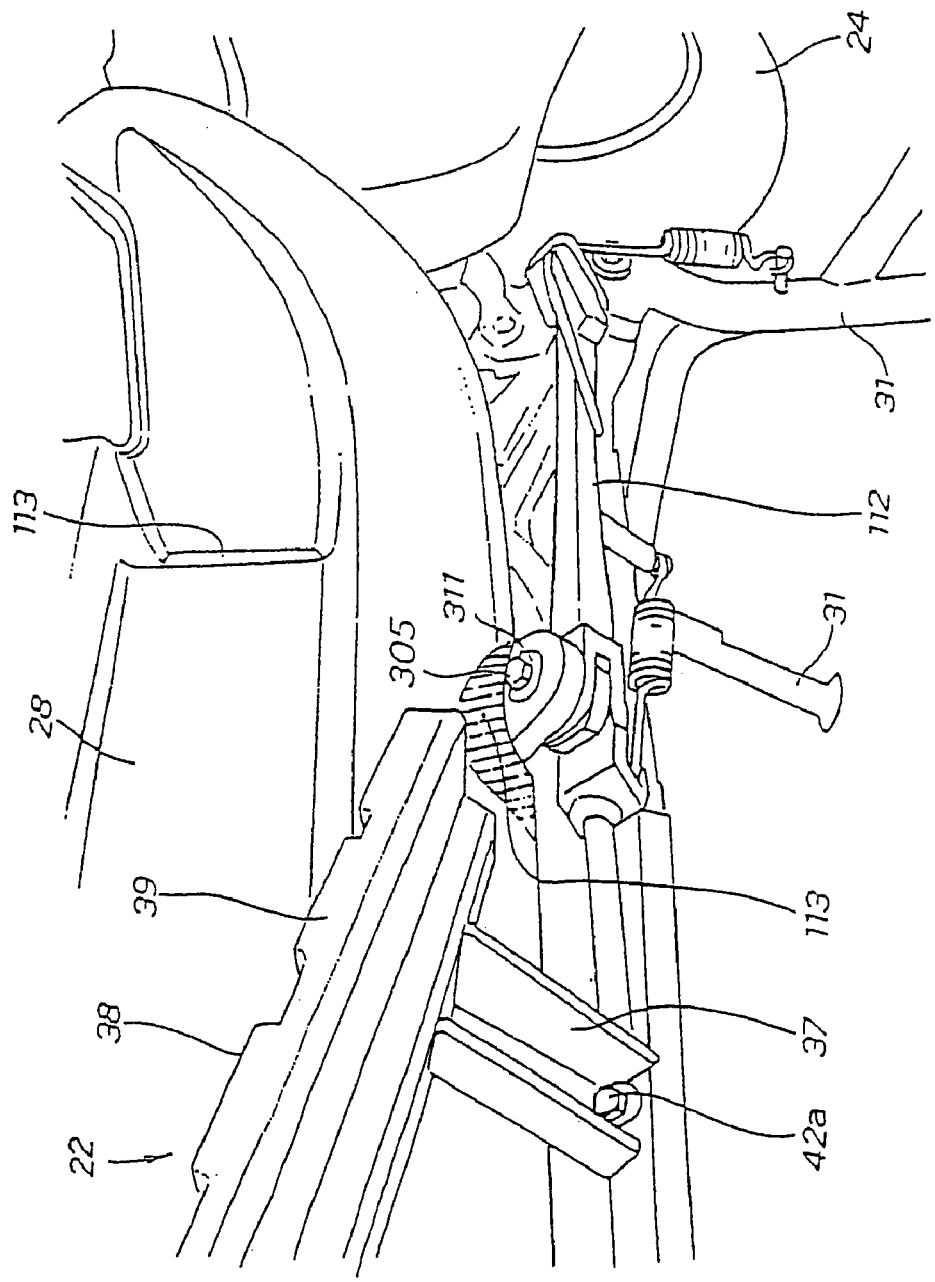
FIG. 7 is a perspective view showing the side stand cover portion according to the embodiment of the present invention.

FIG. 7 is a perspective view showing the side stand cover portion according to the embodiment of the present invention. FIG. 7 shows that a side stand cover portion 113 (a shaded area in FIG. 7) for covering at least part of a side stand 112 provided for the vehicle is provided for the side cover 28. A fastening bolt 305 is provided for mounting the side stand 112.

The side cover 28 extends to integrally form the side stand cover portion 113. This eliminates the need for any special part for covering the side stand 112. Therefore, there is no possibility of the number of parts used being increased.

A side stand switch 311 is provided concentrically with a side stand pivot, the side stand switch 311 is turned on or off according to the degree of tilt of the stand.

As a result, the switch can be protected as much as possible, while ease of removal and reinstallation of the switch is ensured.

Figure 8:
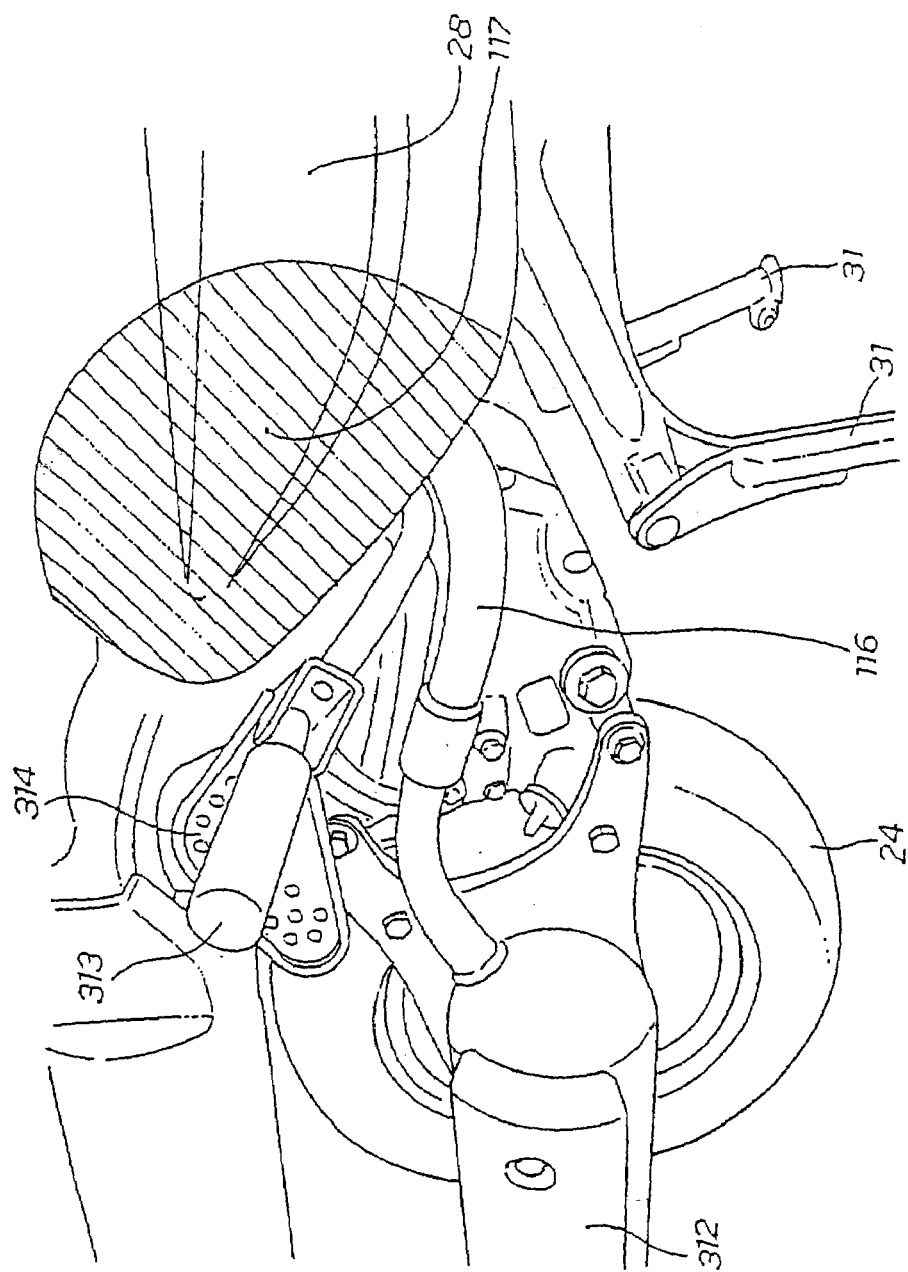
FIG. 8 is a perspective view showing the exhaust pipe cover portion according to the embodiment of the present invention.

FIG. 8 is a perspective view showing the exhaust pipe cover portion according to the embodiment of the present invention. FIG. 8 shows that an exhaust pipe cover portion 117 for covering at least part of an exhaust pipe 116 extending from the engine of the vehicle is provided for the side cover 28. A muffler 312 is provided together with a pillion step 313 and a guard 314.

The exhaust pipe cover portion 117 for covering part of the exhaust pipe 116 is provided for the side cover 28. No extra parts for covering the exhaust pipe 116 are therefore necessary. There is therefore no chance of increasing the number of parts used.

The effect of the embodiment of the present invention will be explained as follows.

Referring back to FIG. 6, the air admission portion 102 for drawing in the cooling air for cooling the radiator is provided in the side cover 28. The main step 22, on which the rider places his or her foot, is disposed outside the air admission portion 102.

The cooling air passes inward in the direction of vehicle width from the main step 22 provided outboard the side cover 28. This enhances the degree of freedom in designing the area under the main step 22.

Figure 9:
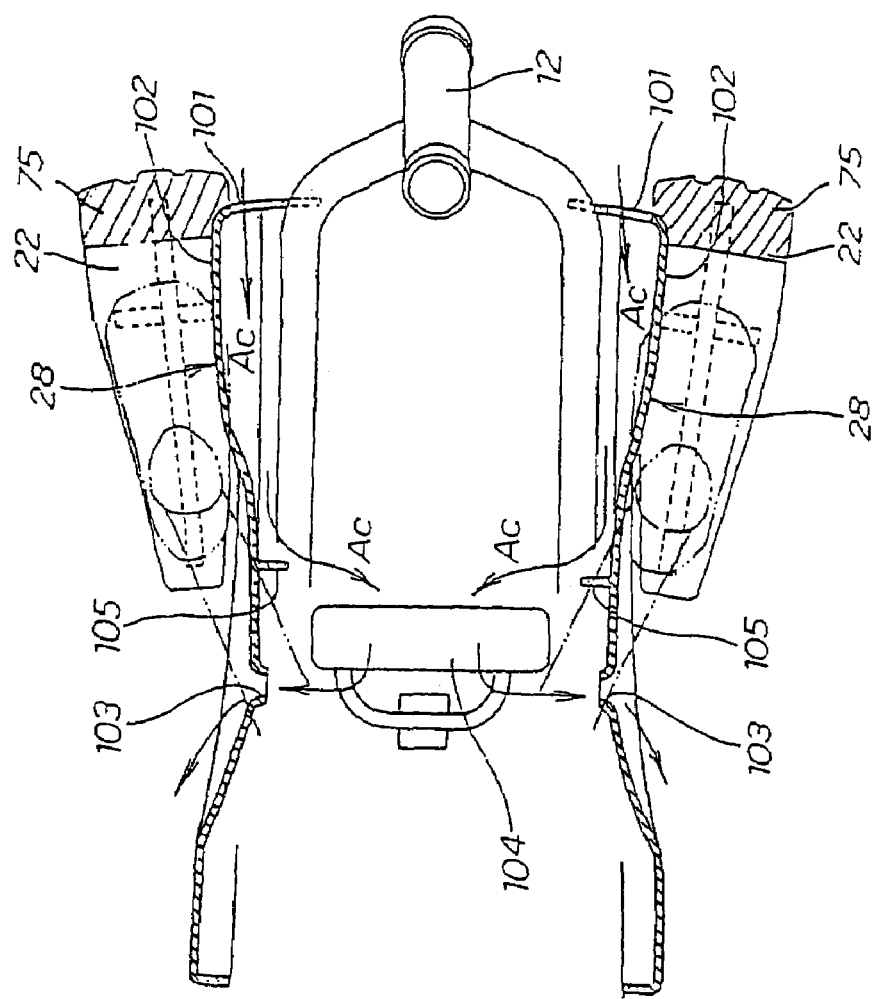
FIG. 9 is a diagram showing the operation of the side cover.
Figure 10:
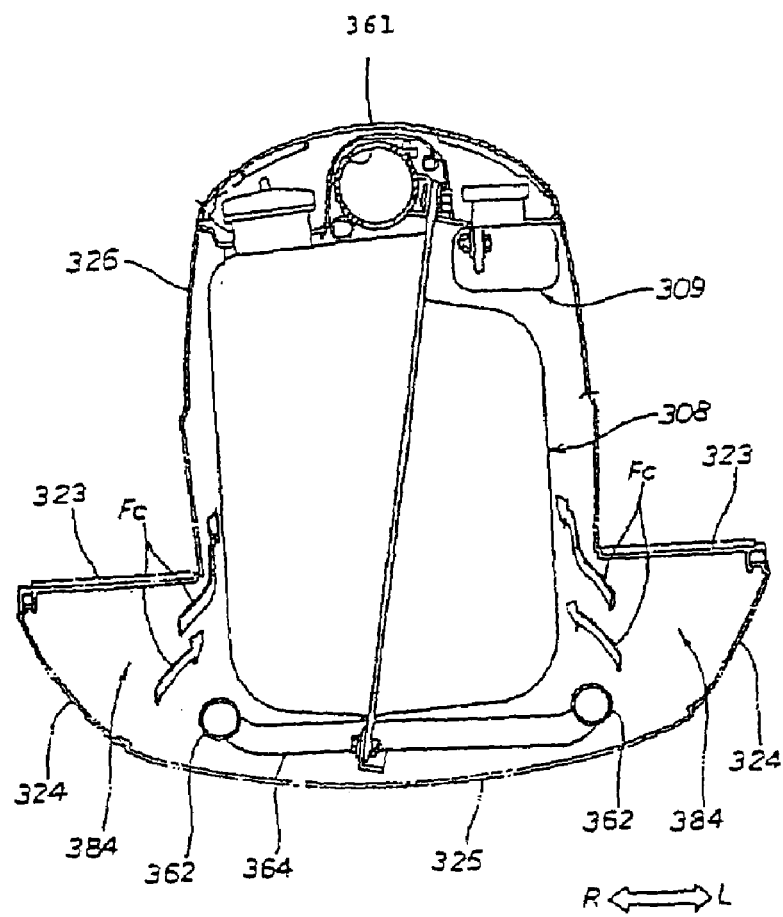
FIG. 10 is an explanatory view showing the basic configuration of the prior art arrangement.

FIG. 9 is a diagram showing the operation of the side cover. The cooling air AC enters the inside of the side cover 28 through the air admission window 101 forming part of the air admission portion 102. The air AC is then guided by the guide member 105 formed integrally with the side cover 28 and fed onto the radiator 104. The air that has passed through the radiator 104 is exhausted to the outside through the air exhaust port 103.

The air admission portion 102 projects at a portion thereof corresponding to the ankle of the rider. No part of the air admission portion 102 exists to interfere with the foot portion. Thus, the rider is allowed to position his or her foot.

The vehicle having vehicle body side covers for covering the radiator according to the embodiment of the present invention is applied to a two-wheeled vehicle. The invention can nonetheless be applied to a three-wheeled vehicle and even a general vehicle.

The side covers according to the embodiment of the present invention is preferably applied to a two-wheeled vehicle.

Figure 11:
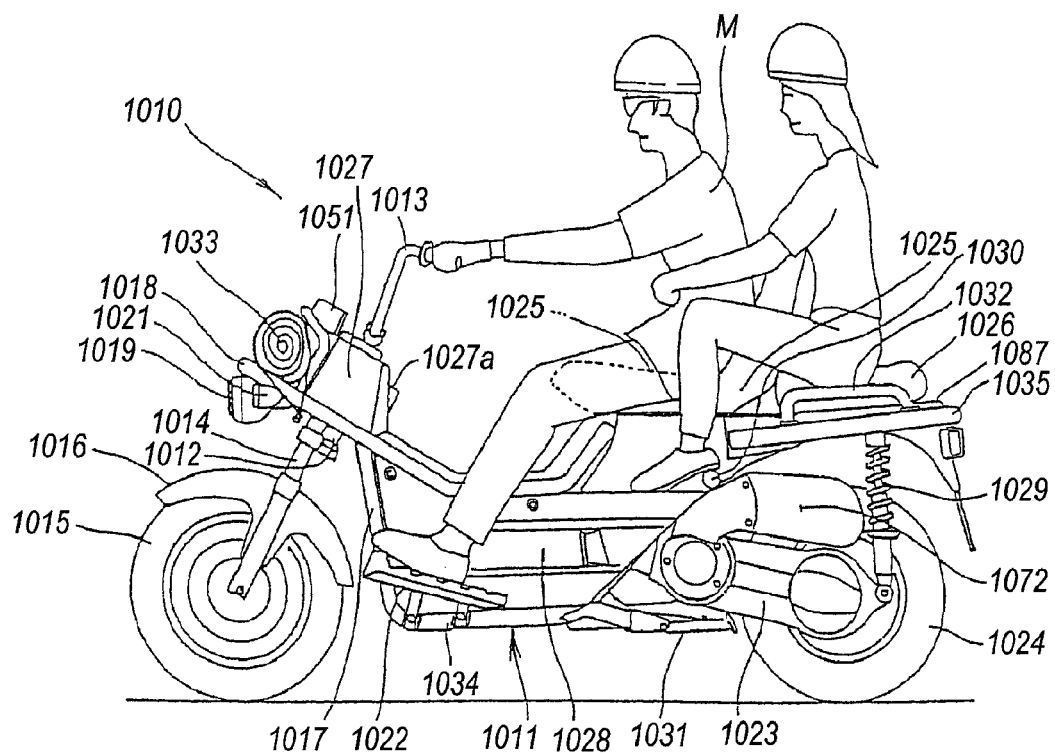
FIG. 11 is a side elevational view showing a scooter type vehicle according to the embodiment of the present invention.

FIG. 11 is a side elevational view showing a scooter type vehicle according to the embodiment of the present invention. A scooter type vehicle 1010 includes a steering handlebar 1013 that is steerably mounted to a head pipe 1012 at a front portion of a vehicle body frame 1011. A front wheel 1015 and a front fender 1016 are mounted to a front fork 1014 connected to the steering handlebar 1013.

A separate frame 1018 is mounted on the vehicle body frame 1011. A headlamp 1019, a turn signal lamp 1021 and the like are attached to the separate frame 1018. A main step 1022 is attached to a down tube 1017. A power unit 1023 is vertically swingably mounted to a rear portion of the vehicle body frame 1011. A rear wheel 1024 is mounted at a rear portion of the power unit 1023. A rider's seat 1025 is provided obliquely, upwardly and forwardly of the rear wheel 1024. A rear seat combined with a seat back 1026 is provided upwardly of the rear wheel 1024. The scooter type vehicle 1010 as described above is a two-seater light vehicle.

Referring to FIG. 11, a steering handlebar post cover 1027 is provided together with a shelf portion 1027a of the steering handlebar post cover, a side cover 1028, a rear shock absorber 1029, a tandem step 1030, a stand 1031 and a grab rail 1032.

Figure 12:
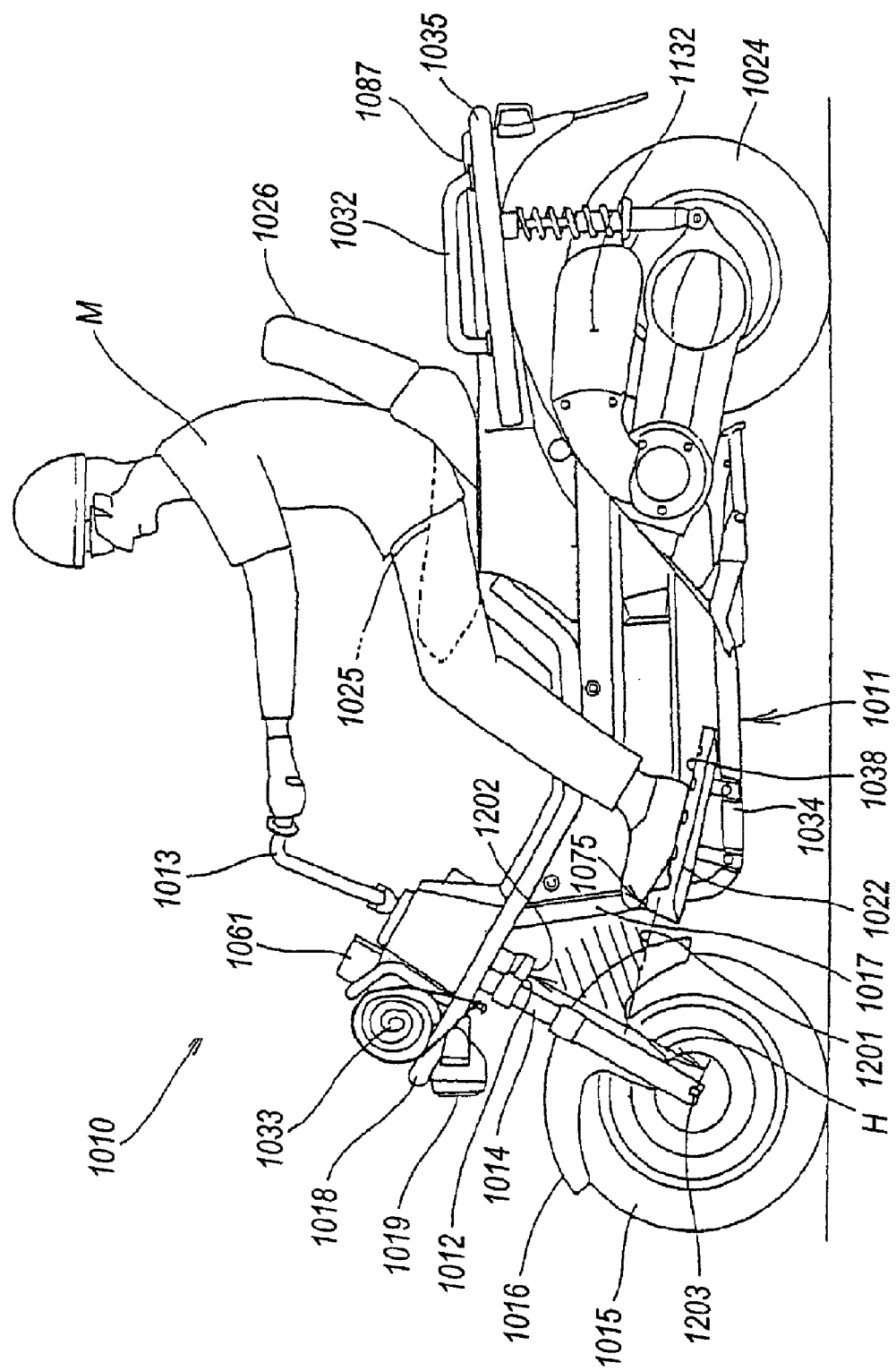
FIG. 12 is a side elevational view showing a one-seater version of the scooter type vehicle according to the present invention.

FIG. 12 is a side elevational view showing a one-seater version of the scooter type vehicle according to the present invention. The one-seater version shares the same basic construction with the two-seater version, as shown in FIG. 11. The same reference numerals are borrowed from the two-seater version and an explanation thereof is omitted. FIG. 12 shows where the rear seat combined with a seat back 1026 is raised into an upright position to serve as a seat back for a rider M. FIG. 12 also shows that cargo 1033, such as a tent, is loaded at the front portion of the separate frame 1018.

The one-seater version includes not only the steering handlebar 1013 and the grab rail 1032, but also the separate frame 1018, the down tube 1017, a lower pipe 1034 extending from the down tube 1017 and a rear frame 1035 that are all exposed.

In the conventional scooter type vehicle, it is common practice to cover the vehicle body frame with a vehicle body cover to ensure that most of the vehicle body frame is not exposed. According to the present invention, on the other hand, a most part of the vehicle body frame is exposed to exhibit a completely new appearance feature.

The scooter type vehicle according to the present invention is not provided with any leg shield. The vehicle is provided with footpeg surfaces 1038 on both sides thereof at a position near a rear portion of the front wheel 1015. Further, the main steps 1022 are disposed in such a manner that the legs of the rider with feet placed on the footpeg surfaces 1038 form an obtuse angle of more than 90° at their knees. Each of the main steps 1022 is provided with a step portion 1075 projecting upwardly at a front end portion 1074 thereof.

Figure 13A:
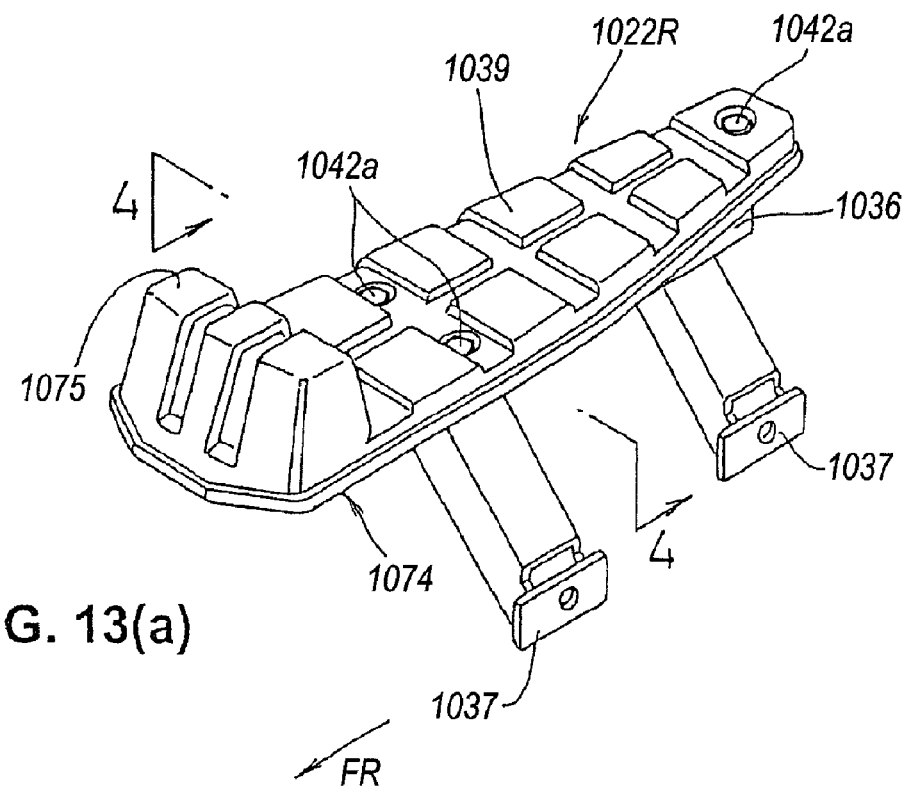
FIGS. 13(a) and 13(b) are perspective views showing a main step adopted in the embodiment according to the present invention.
Figure 13B:
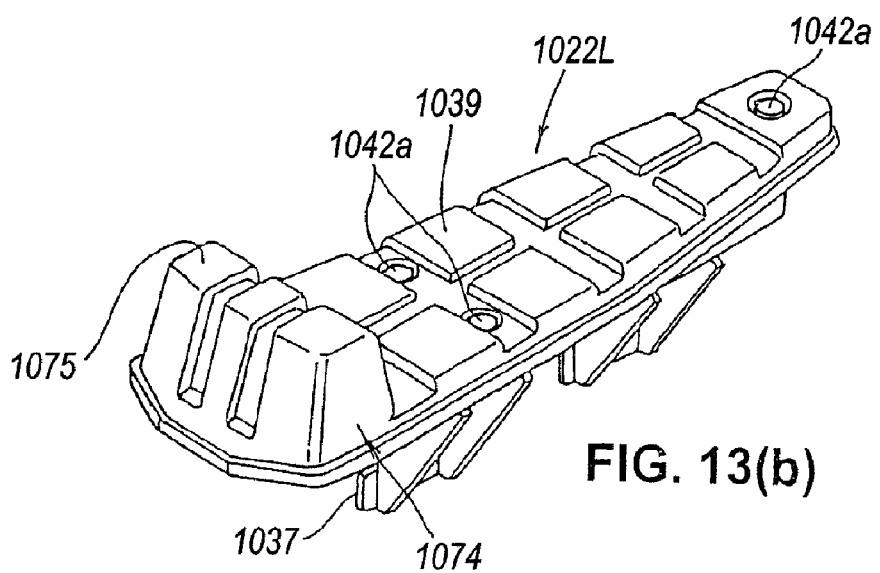

FIGS. 13(a) and 13(b) are perspective views showing the main step adopted in the embodiment according to the present invention. A right main step 1022R (R is a suffix representing the right-hand side), on which the rider places his or her right foot, includes the following parts. The component parts specifically include: a bracket 1036 (see FIG. 14), a step support stay 1037 for connecting the bracket 1036 to the lower pipe 1034 and a plastic cover 1039 mounted on a top surface of the bracket 1036.

A left main step 1022L (L is a suffix representing the left-hand side), on which the rider places his or her left foot, is of the same construction as the right main step 1022R. The same reference numerals are borrowed from the illustration showing the right main step 1022R and an explanation thereof is omitted.

The main step 1022 is shaped to be symmetrical about the centerline thereof and the footpeg surface 1038 is shaped like a trapezoid with a wider front portion and a narrower rear portion. This saves extra footpeg surfaces 1038, while the right and left steps can be standardized.

Figure 14:
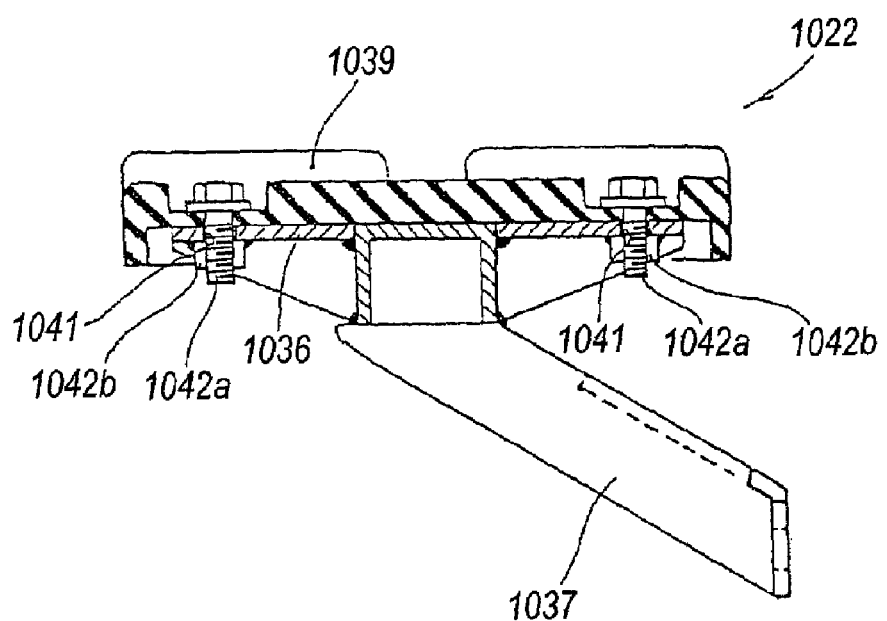
FIG. 14 is a cross-sectional view taken along line 4-4 of FIG. 13.

FIG. 14 is a cross-sectional view taken along line 4-4 of FIG. 13. FIG. 14 illustrates holes 1041 ... ( ... indicates that there are a plurality of holes, the same applies hereafter) for fastening the plastic cover 1039 that are made in the bracket 1036. The bracket 1036 can be removably mounted through fastening bolts 1042*a* ... and fastening nuts 1042*b* ... that are aligned with the holes 1041.

The main step 1022 is formed by placing the plastic cover 1039 over the bracket 1036 extending from the vehicle body frame 1011 by way of the step support stay 1037. The aesthetic appearance of the main step 1022 and surrounding parts can therefore be enhanced.

A conventional flat sheet type step is formed through aluminum diecasting or the like. Diecastings are popular for a good appearance. A cost reduction can be expected with diecastings in vehicles of mid-to-small sizes.

Steps assembled by welding steel plates together are also known. These steps are inferior to the aluminum diecasting steps in terms of weight, appearance and the like.

With the main steps 1022 (1022L, 1022R) according to the embodiment of the present invention, the bracket 1036 can be made thinner and lighter in weight. As a result, the weight and cost can be further reduced, while maintaining the appearance of the main steps 1022L, 1022R, than the diecasting steps.

In addition, the main step 1022 according to the embodiment of the present invention can be manufactured by cutting a steel stock, and subjecting the cut steel sheet to a bending, drawing, and other plastic working operations and a welding process. The manufacturing processes require no dies, molds, or diecasting machines. This permits a greater cost reduction than the diecasting steps.

Figure 15:
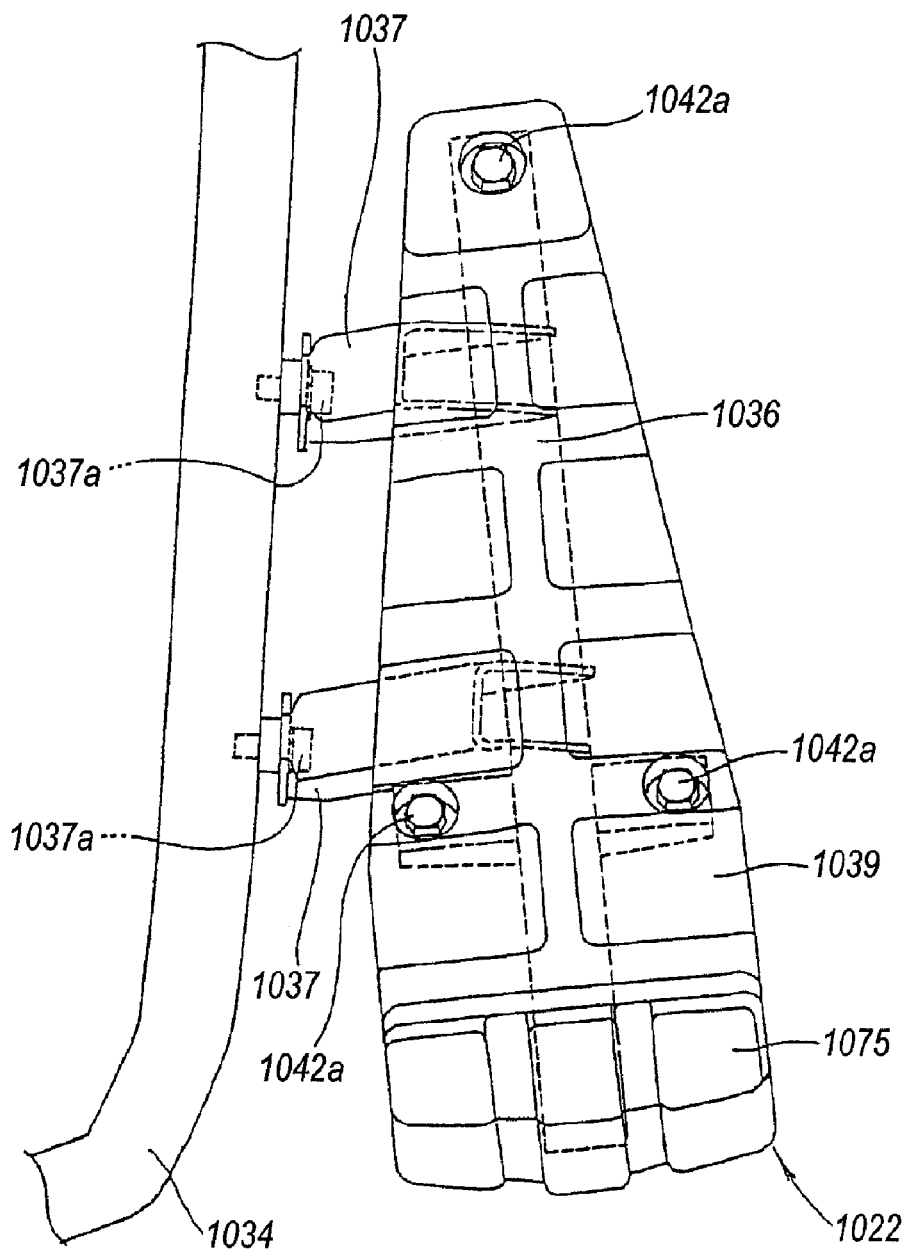
FIG. 15 is a plan view showing the main step as embodied in the present invention.

FIG. 15 is a plan view showing the main step as embodied in the present invention. FIG. 15 shows the following conditions. Specifically, the step support stays 1037 are attached to the lower pipe 1034 through the vehicle body using mounting bolts 1037*a*. The bracket 1036 is mounted to a leading edge portion of the step support stays 1037. The plastic cover 1039 is fitted over the bracket 1036. The bracket 1036 is mounted through fastening bolts 1042*a* . . . and fastening nuts 1042*b* . . . (see FIG. 13) that are aligned with the holes 1041 ... ( ... indicates that there are a plurality of holes; same applies hereunder) for fastening the plastic cover 1039.

Figure 16:
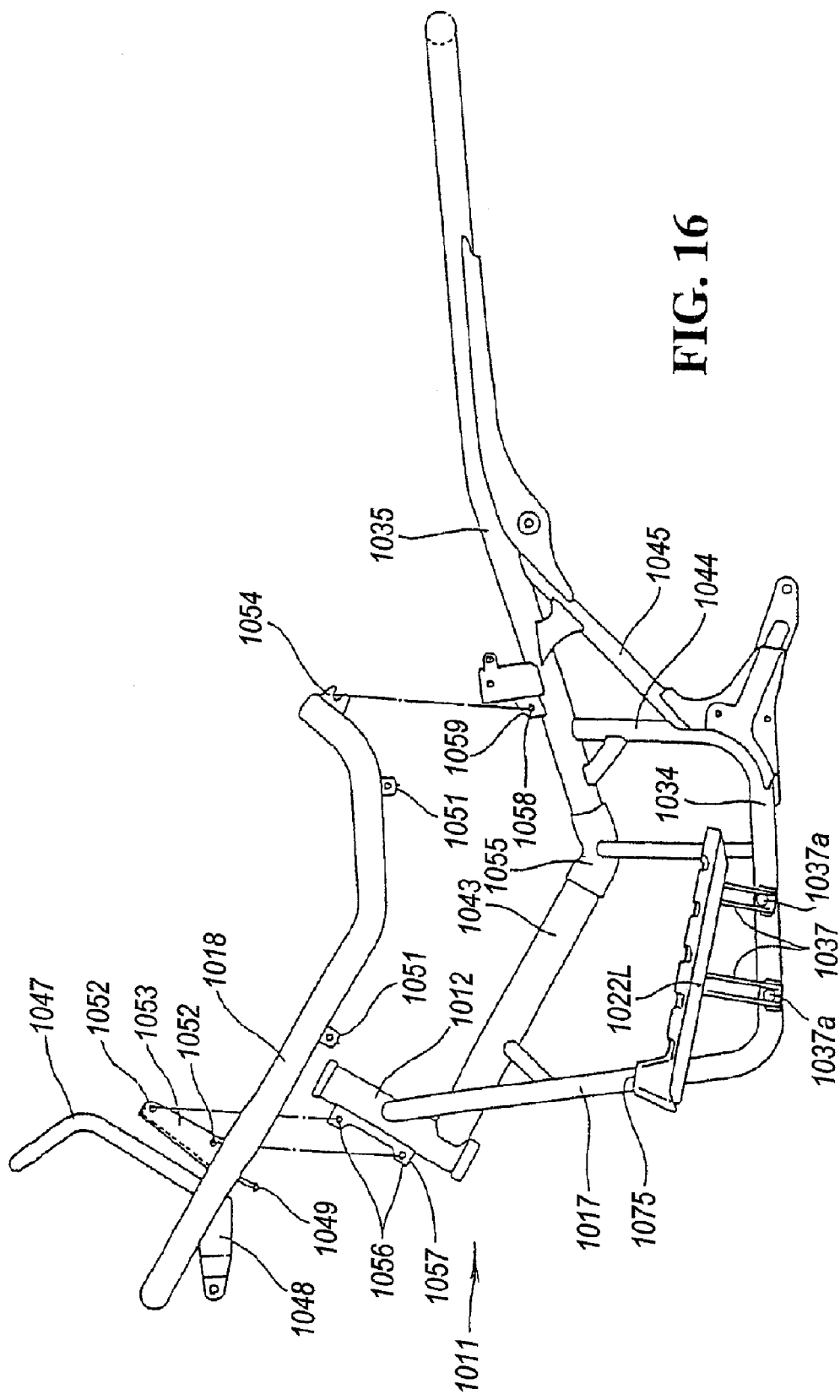
FIG. 16 is an exploded view showing a vehicle body frame of the scooter type vehicle according to the embodiment of the present invention.

FIG. 16 is an exploded view showing the vehicle body frame of the scooter type vehicle according to an embodiment of the present invention. The vehicle body frame 1011 includes a main frame 1043 extending from the head pipe 1012 and being V-shaped or U-shaped as viewed from a side with the rear frame 1035 forming a rear portion of the main frame 1043 or extending the main frame 1043 rearwardly. The down tube 1017 drops downwardly from the head pipe 1012 with the lower pipe 1034 extending substantially horizontally from the down tube 1017. A center frame 1044 rises upwardly from a rear end of the lower pipe 1034. A stay 1045 is provided for connecting the center frame 1044 with the rear frame 1035.

Referring to FIG. 16, the frame of a simple shape that is shown separated upwardly is the separate frame 1018.

The separate frame 1018 is provided with a cargo receiving pipe 1047 on the top surface at the front portion thereof and a lamp support bracket 1048 and a cargo strap hook 1049 on the bottom at the front thereof. The separate frame 1018 further includes cover fixing plates 1051, 1051 on the bottom surface thereof. The separate frame 1018 still further includes a bracket 1053 having holes 1052 therein on the top surface at the front portion thereof and U-shaped brackets 1054 on the bottom surface in the rear portion thereof.

A front portion plate 1057 having holes 1056, 1056 therein is provided on the front surface of the head pipe 1012. A rear portion plate 1059 having a hole 1058 therein is provided on the top surface at the front portion of the rear frame 1035.

The rear portion plate 1059 is disposed at a position near a connection 1055 between the main frame 1043 and the rear frame 1035. The connection 1055 is a portion, at which one main frame 1043 meets two rear frames 1035. The connection 1055 has a high rigidity. If the rear portion plate 1059 is provided at a position near (rearward according the embodiment of the present invention) this highly rigid connection 1055, it is advantageous in terms of strength in supporting the separate frame 1018.

The bracket 1053 is bolted to the front portion plate 1057. The U-shaped bracket 1054 is bolted to the rear portion plate 1059. The separate frame 1018 can thereby be integrated with the head pipe 1012 and the main frame 1043.

Figure 17:
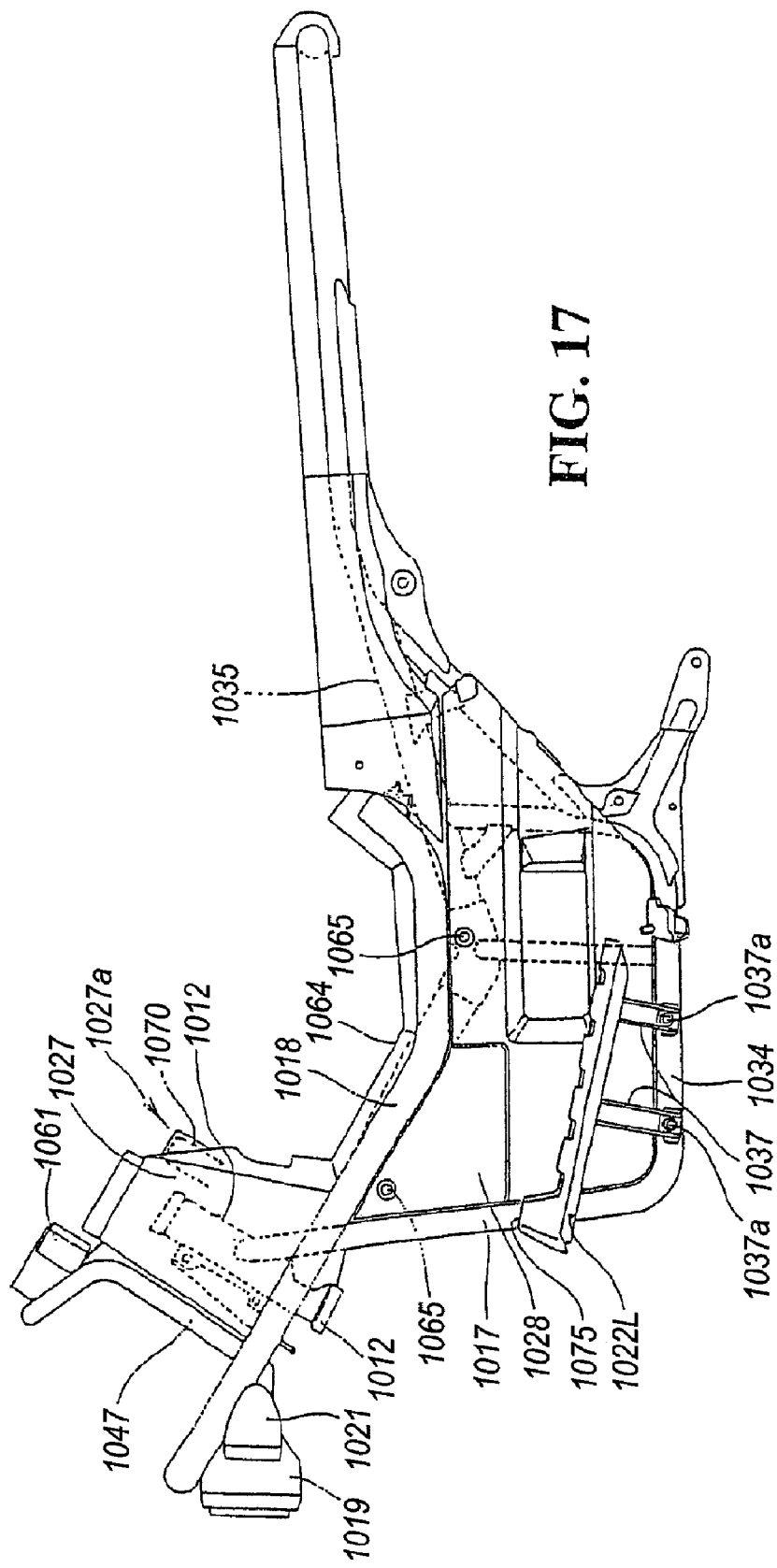
FIG. 17 is a side elevational view showing the vehicle body frame of the scooter type vehicle according to the embodiment of the present invention.

FIG. 17 is a side elevational view showing the vehicle body frame of the scooter type vehicle according to the embodiment of the present invention. FIG. 17 illustrates the separate frame 1018 that is mounted to the head pipe 1012 and the rear frame 1035. A center cover portion 1064, integrally including the steering handlebar post cover 1027, is then placed thereon. The side cover 1028 is attached between the separate frame 1018 and the lower pipe 1034 using bolts 1065 .... The main step 1022L is then mounted to the lower pipe 1034.

As shown in FIG. 17, the front surface of the steering handlebar post cover 1027 is formed into a flat surface to provide an ample cargo space at the front thereof.

The shelf portion 1027*a* is formed in the rear at an upper portion of the steering handlebar post cover 1027. The shelf portion 1027*a* is one step down from the steering handlebar post cover 1027. An ignition switch-handle bar interlocked security system 1070 is attached to the shelf portion 1027*a*.

Figure 18:
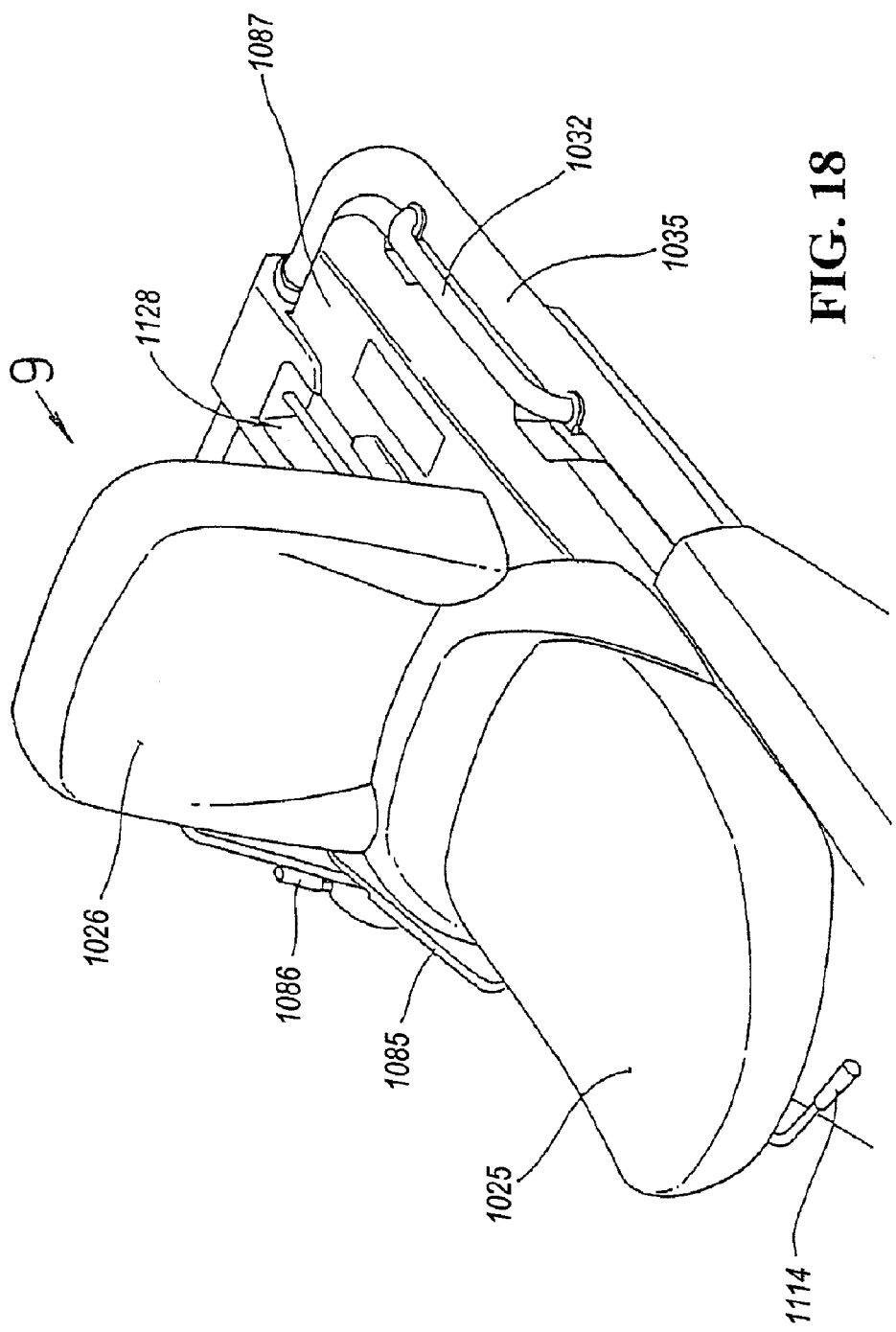
FIG. 18 is a perspective view showing a rider's seat (with a rear seat raised into an upright position) according to the embodiment of the present invention.

FIG. 18 is a perspective view showing the rider's seat (with the rear seat raised into an upright position) according to the embodiment of the present invention. Raising the rear seat combined with a seat back 1026 into the upright position makes the rider's seat 1025 a seat with a seat back. The angle of the rear seat combined with a seat back 1026 can be varied by operating a lock lever 1086 attached to a coupling link 1085.

FIG. 18 also shows that a cargo mounting portion 1087 and the grab rail 1032 are mounted to the rear frame 1035.

The cargo mounting portion 1087 is formed by a plastic or light metal sheet having a rugged surface thereon. With the rugged sheet, a section modulus can be increased by a large margin as compared with a flat sheet. This allows more cargo to be mounted on the cargo mounting portion 1087.

Figure 19:
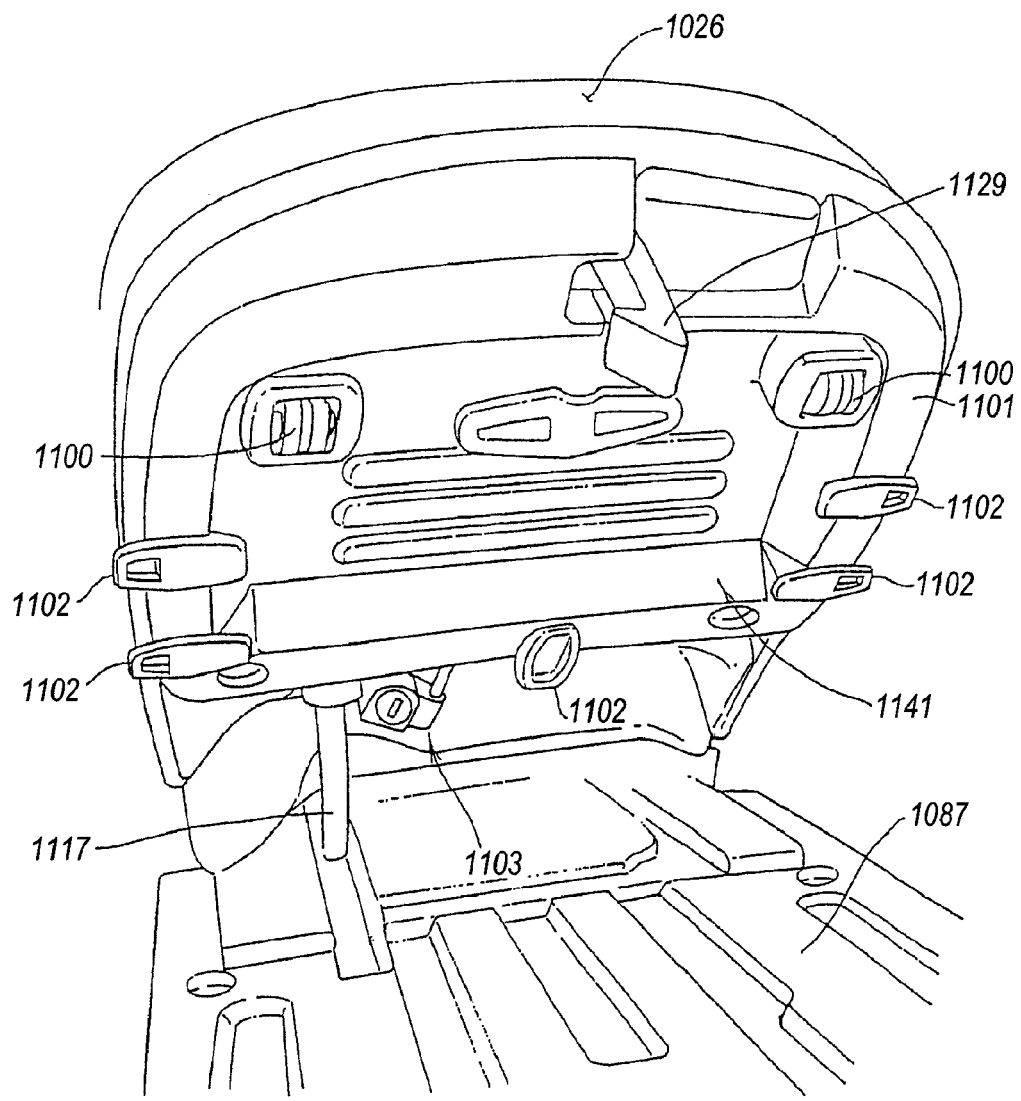
FIG. 19 is a view on arrow 9 of FIG. 18.

FIG. 19 is a view on arrow 9 of FIG. 18. FIG. 19 shows the construction of the backside (bottom surface) of the rear seat combined with a seat back 1026 and a helmet holder 1103 mounted on the backside of the rear seat combined with a seat back 1026.

Figure 21:
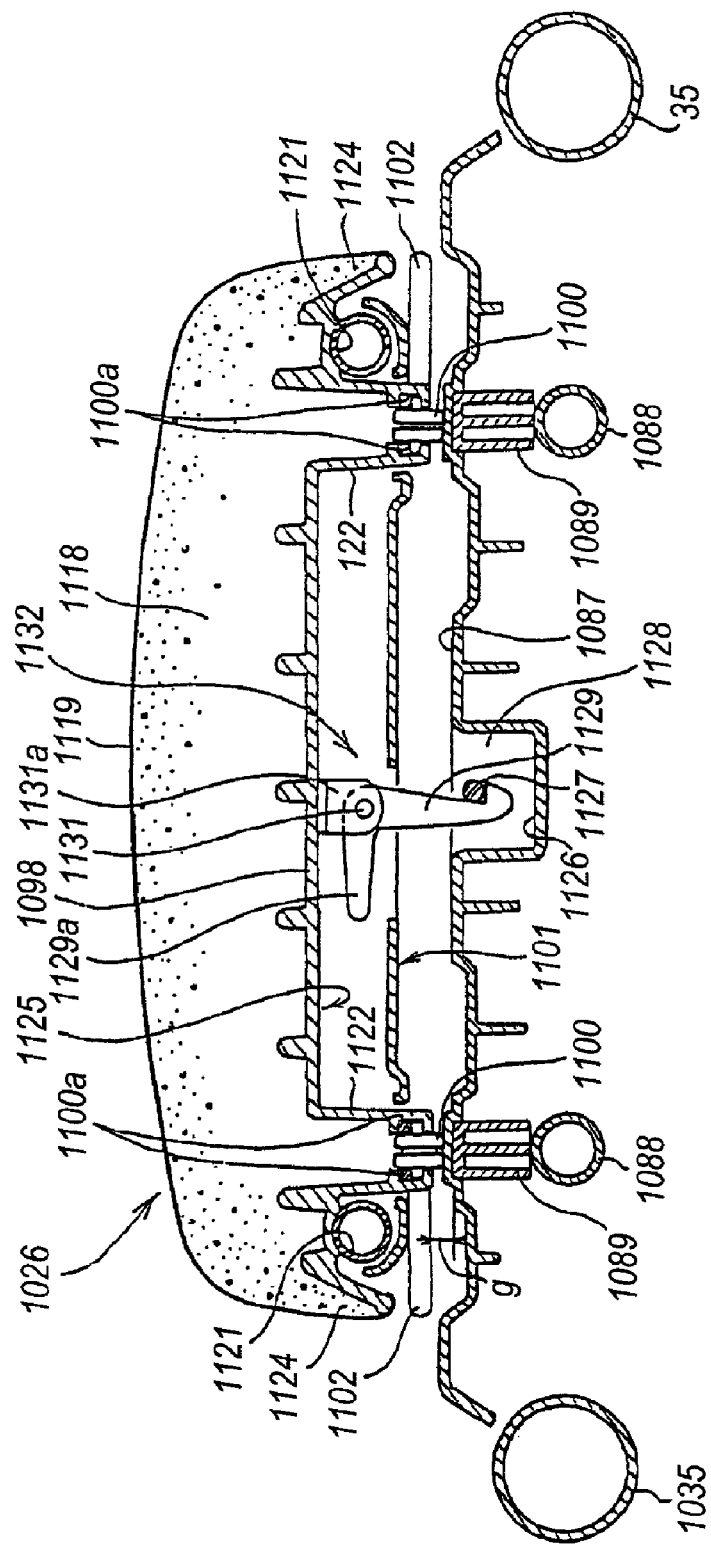
FIG. 21 is a cross sectional view taken along line 11-11 in FIG. 20 (the grab rail being omitted)

The rear seat combined with a seat back 1026 includes a seat bottom plate 1098, that is shown in FIG. 21 to be described later, enclosing a cushion material that is further enclosed by a back plate 1101. A plurality of T-shaped hooks 1102 . . . are provided at, for example, an upper portion on both sides and a lower portion on both sides of the back plate 1101. A reference numeral 1100 represents rolls. The rolls 1100 use elastic members 1100*a* forming bearing portions thereof to support a passenger who mounts the rear seat 1026.

The back plate 1101 provides an appearance member when no cargo is loaded in the rear of the vehicle. The back plate 1101 is therefore formed using an aesthetically fine sheet material. In addition, a bending force by the T-shaped hooks 1102 is applied to the back plate 1101. The rigidity is therefore enhanced for the back plate 1101. A rugged sheet is therefore used for the back plate 110 1 to gain additional section modulus. A steel sheet, a plastic sheet, or the like is appropriate for the back plate 1101. The back plate 1101 is then subjected to surface treatment of coating, plating, coloring, or the like, since the plate forms an appearance member.

The helmet holder 1103 is mounted on the back plate 1101 covering a bottom surface or a rear surface 1141 of the seat back 1026. The helmet holder 1103 can be exposed by raising the seat back 1026 into the upright position.

Figure 20:
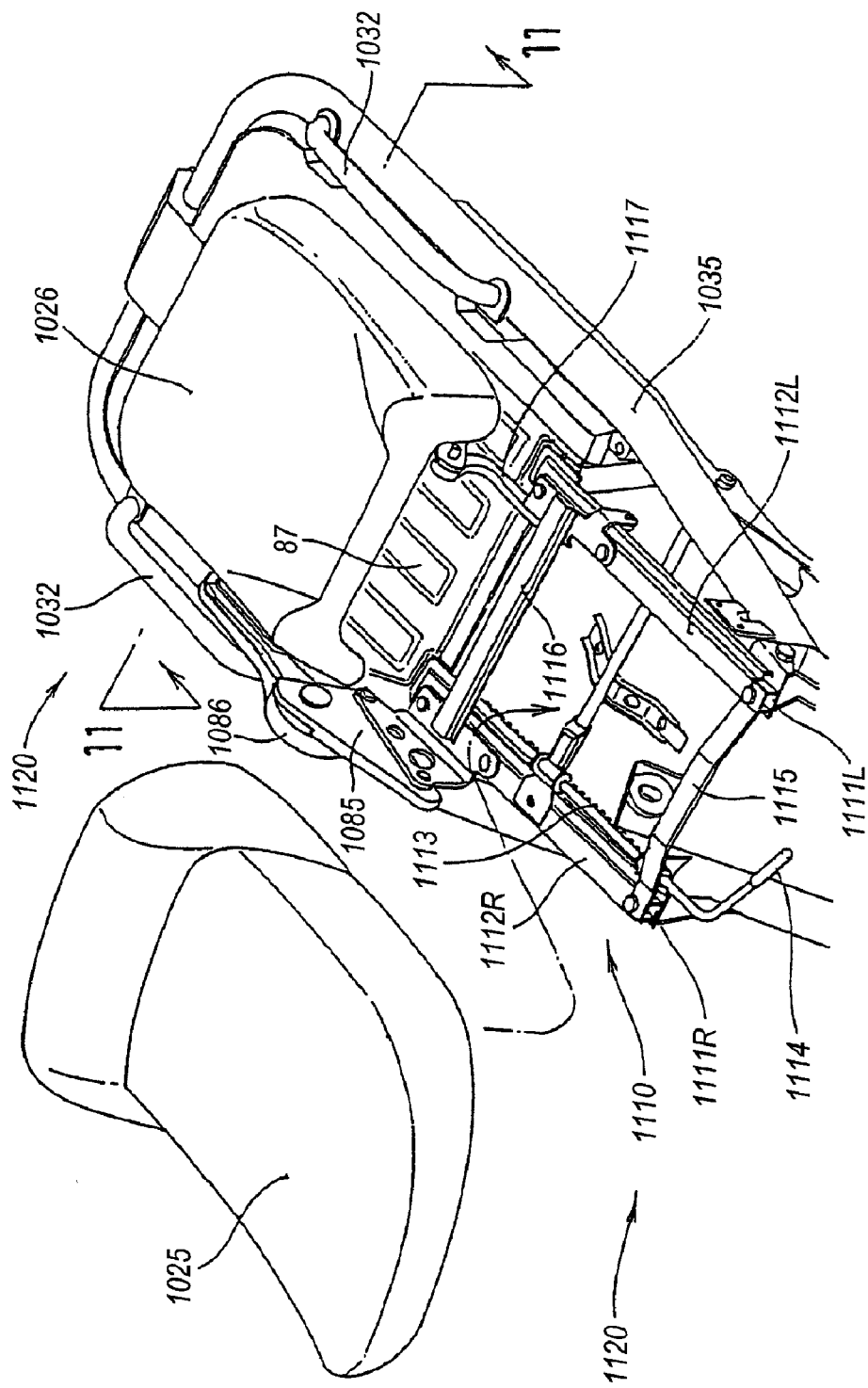
FIG. 20 is an explanatory view showing a seat sliding mechanism adopted in the embodiment of the present invention.

FIG. 20 is an explanatory view showing a seat sliding mechanism used in the embodiment of the present invention. The fore-aft position of the rider's seat 1025 according to the embodiment of the present invention can be varied according to rider's preference. A seat sliding mechanism 1110 is provided for a vehicle body rear portion 1120 to achieve this purpose.

The seat sliding mechanism 1110 includes a left and a right seat rail 1111L, 1111R; a left and a right slider 1112L, 1112R mounted slidably in the fore-aft direction to the left and the right seat rail 1111L, 1111R; a slide-lock sawtooth member 1113 provided for the right slider 1112R; an operating lever 1114 used to rotate the sawtooth member 1113 to set the same into a locked or unlocked state; a front and a rear cross member 1115, 1116 for connecting the left and the right slider 1112L, 1112R; the coupling link 1085 extending from a rear portion of the right slider 1112R and a link 1117 extending from a rear portion of the left slider 1112L.

The left and the right sliders 1112L, 1112R can be freely moved in the fore-aft direction.

The rider's seat 1025 is secured to the left and right sliders 1112L, 1112R. The rear seat combined with a seat back 1026 is secured to the coupling link 1085 and the link 1117. This allows the rider to perform the following operations. More specifically, the rider operates the operating lever 1114 to unlock the sliding mechanism. The rider is thereby able to move the rider's seat 1025 and the rear seat combined with a seat back 1026 to any desired position in the fore-aft direction. By returning the operating lever 1114, the rider can lock the rider's seat 1025 and the rear seat combined with a seat back 1026 at that particular position.

The rider or the passenger can bring the rear seat combined with a seat back 1026 into a horizontal position as shown in FIG. 20 by operating the lock lever 1086.

FIG. 21 is a cross-sectional view taken along line 11-11 in FIG. 20 with the grab rail omitted, looking forwardly. The cross-sectional structure of the rear seat as combined with a seat back 1026 will be first explained. The rear seat combined with a seat back 1026 includes a cushion material 1118 such as a sponge, a skin 1119 and a seat bottom plate 1098. Added to this basic structure are a reinforcement rib 1121 placed along the seat bottom plate 1098 and legs 1122, 1122 extended therefrom.

A first engagement portion 1128 including a slit 1126 and an engagement pin 1127 is provided at a central portion of the cargo mounting portion 1087. Relative to the first engagement portion 1128, a second engagement portion 1132 is provided from a recessed portion 125 in the bottom surface on the side of the rear seat combined with a seat back 1026. The second engagement portion 1132 includes a hook 1129, a hook pin 1131 and a support member 1131a. FIG. 21 shows where the first engagement portion 1128 is engaged with the second engagement portion 1132. 10

A hook lever 1129a is provided so that when the rider rotates the hook lever 1129a upward by hand, the hook 1129 is disengaged from the pin 1127, allowing the rear seat 1026 to function as a seat back.

The reinforcement rib 1121 is connected to the link 1117 shown in FIG. 20.

Edge portions 1124, 1124 project downwardly from the seat bottom plate 1098 and the recessed portion 1125 is formed at the center thereof to make the seat look thick. The recessed portion 125 and the reinforcement rib 1121 are covered as a whole with the back plate 1101. This enhances the appearance quality when the rear seat is combined with a seat back 1026 and is raised into the upright position.

The legs 1122, 1122 project to mate with the right and left inner rails 1088, 1088. This allows the weight of a passenger to be supported directly with the inner rails 1088, 1088 by way of the legs 1122, 1122 and leg portions 1089, 1089 of the cargo mounting portion 1087. Only a compression force acts on the leg portions 1089, 1089 of the cargo mounting portion 1087 and no bending force acts on the cargo mounting portion 1087.

The T-shaped hooks 1102, 1102 are set at a level that ensures a clearance g from the cargo mounting portion 1087. The clearance g measures 4 to 5 mm.

Small-sized vehicles at times adopt a tiltable hook or a stowaway type hook. A hook of such a type can be stowed away to maintain a good appearance. The hook is pulled out only when in use, which allows the hook to be designed largely to gain a hooking margin for a rope.

However, if the rear seat combined with a seat back 1026 is inadvertently folded down with the tiltable hook or the stowaway type hook in its use position, it can damage the cargo mounting portion 1087 and the hook.

In accordance with the embodiment of the present invention, fixed hooks are adopted. With the fixed hooks, the rider does not have to worry about stowing them away. In addition, there is no chance of associated parts being damaged. On the other hand, there is a limit to the mounting space. It is not possible to build a large fixed hook. The solution to this problem according to the present invention is the adoption of the T-shaped hooks 1102. The shape of a T allows right and left claws to be obtained from a horizontal bar of the T with a vertical bar of the T at the center. This configuration allows an ample amount of the rope to be hooked onto and around the vertical bar and two horizontal claws. That is, a greater rope hooking margin can be gained from the T-shaped hook for its shape than an L-shaped hook.

Figure 22:
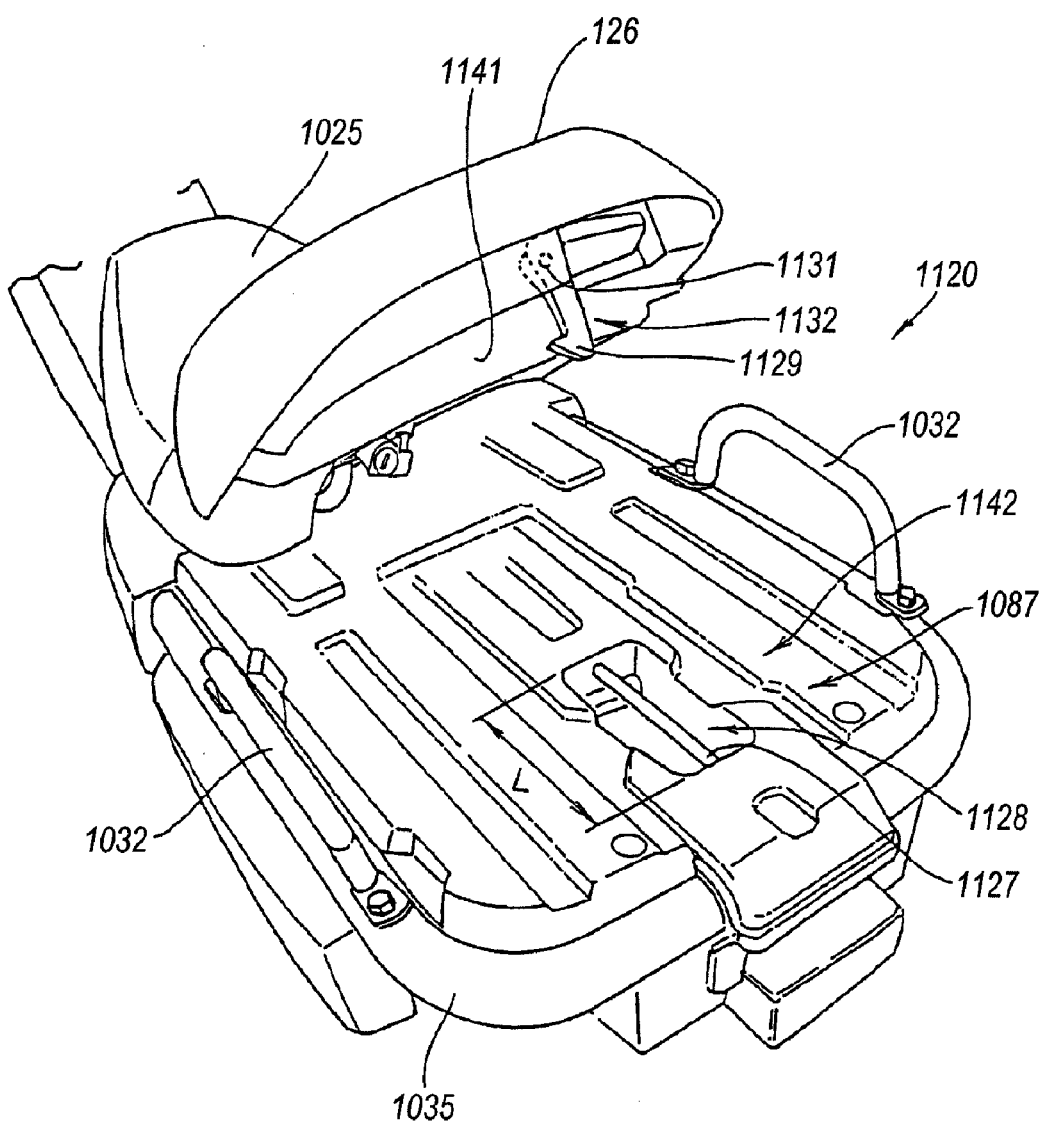
FIG. 22 is a perspective view showing a first engagement portion and a second engagement portion according to the embodiment of the present invention.

FIG. 22 is a perspective view showing the first engagement portion 1128 and the second engagement portion 1132. FIG. 22 shows a vehicle body rear portion structure wherein the rider's seat 1025 is provided slidably in the fore-aft direction of the vehicle body. The rear seat 1026 is provided so as to be mounted on the vehicle body rear portion 1120. The rear seat 1026 is operatively connected to the rider's seat 1025 to be slidable in the fore-aft direction. The rear seat 1026 can be raised to the upright position or lowered to a horizontal position, as rotated about a leading end thereof. The first engagement portion 1128 is provided to extend in the fore-aft direction of the vehicle body in the vehicle body rear portion 1120. The second engagement portion 1132 to be engaged with the first engagement portion 1128 is provided on the bottom surface 1141 of the rear seat 1026.

The first engagement portion 1128 is disposed along the vehicle body centerline. The first engagement portion 1128 can therefore secure the rear seat 1026 by keeping a good balance between the right and left.

Figure 23:
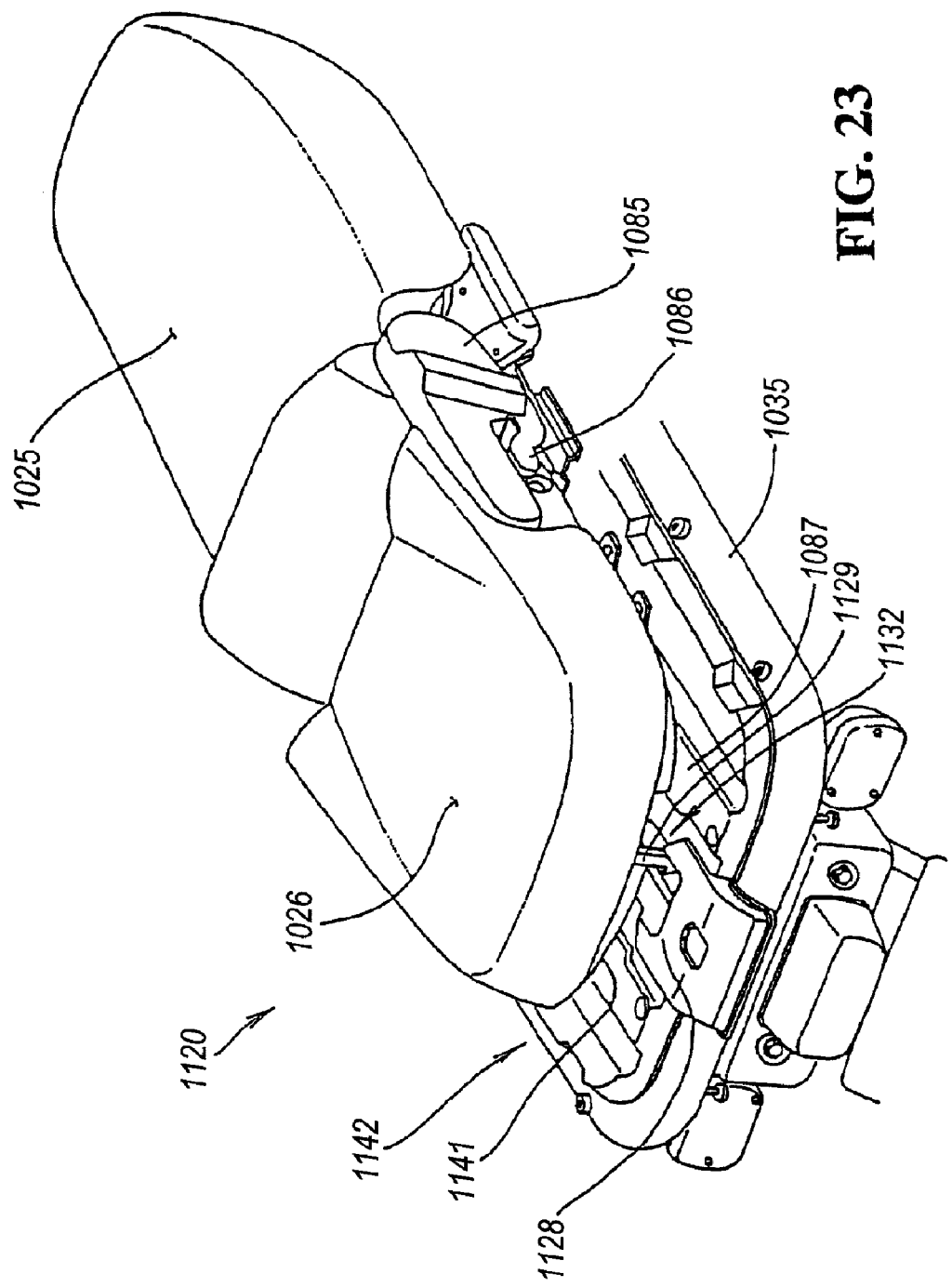
FIG. 23 is a perspective view showing the rider's seat according to the embodiment of the present invention (where the rear seat is lowered; the grab rail omitted)

FIG. 23 is a perspective view showing the rider's seat 1025 according to the embodiment of the present invention (where the rear seat is lowered with the grab rail omitted). The first engagement portion 1128 is disposed in a rear portion 1142 of the vehicle body rear portion 1120.

The arrangement of the first engagement portion 1128 disposed in the rear portion 1142 of the vehicle body rear portion 1120 allows a visual check to be made easily as to whether the first engagement portion 1128 is engaged with the second engagement portion 1132.

In addition, the vehicle body rear portion 1120 is made to serve as the cargo mounting portion 1087. When the leading end of the rear seat 1026 is swung to bring the rear seat 1026 into the horizontal position with the rear surface 1141 of the rear seat 1026 being supported by the cargo mounting portion 1087 of the vehicle body rear portion 1120. This allows the load of the passenger on the rear seat 1026 to be firmly supported.

The vehicle body rear portion structure includes the rear seat 1026 that is provided so as to be operatively connected to the rider's seat 1025 and slidably in the fore-aft direction. The second engagement portion 1132 is provided on the bottom surface 1141 of the rear seat 1026 so that the second engagement portion 1132 is engaged with the first engagement portion 1128 provided in the vehicle body rear portion 1120.

The first engagement portion 1128 extends in the fore-aft direction of the vehicle body rear portion 1120 and the forwardly and rearwardly slidable rear seat 1026 permit the rider's seat 1025 and the rear seat 1026 to be slid in the fore-aft direction with the rear seat 1026 lowered and the second engagement portion 1132 of the rear seat 1026 engaged with the first engagement portion 1128 of the cargo mounting portion 1087.

It is not necessary to raise or lower the rear seat 1026 in order to slide the rider's seat 1025 and the rear seat 1026. It is therefore extremely easy to slide the rider's seat 1025 and the rear seat 1026 in the fore-aft direction.

Figure 24:
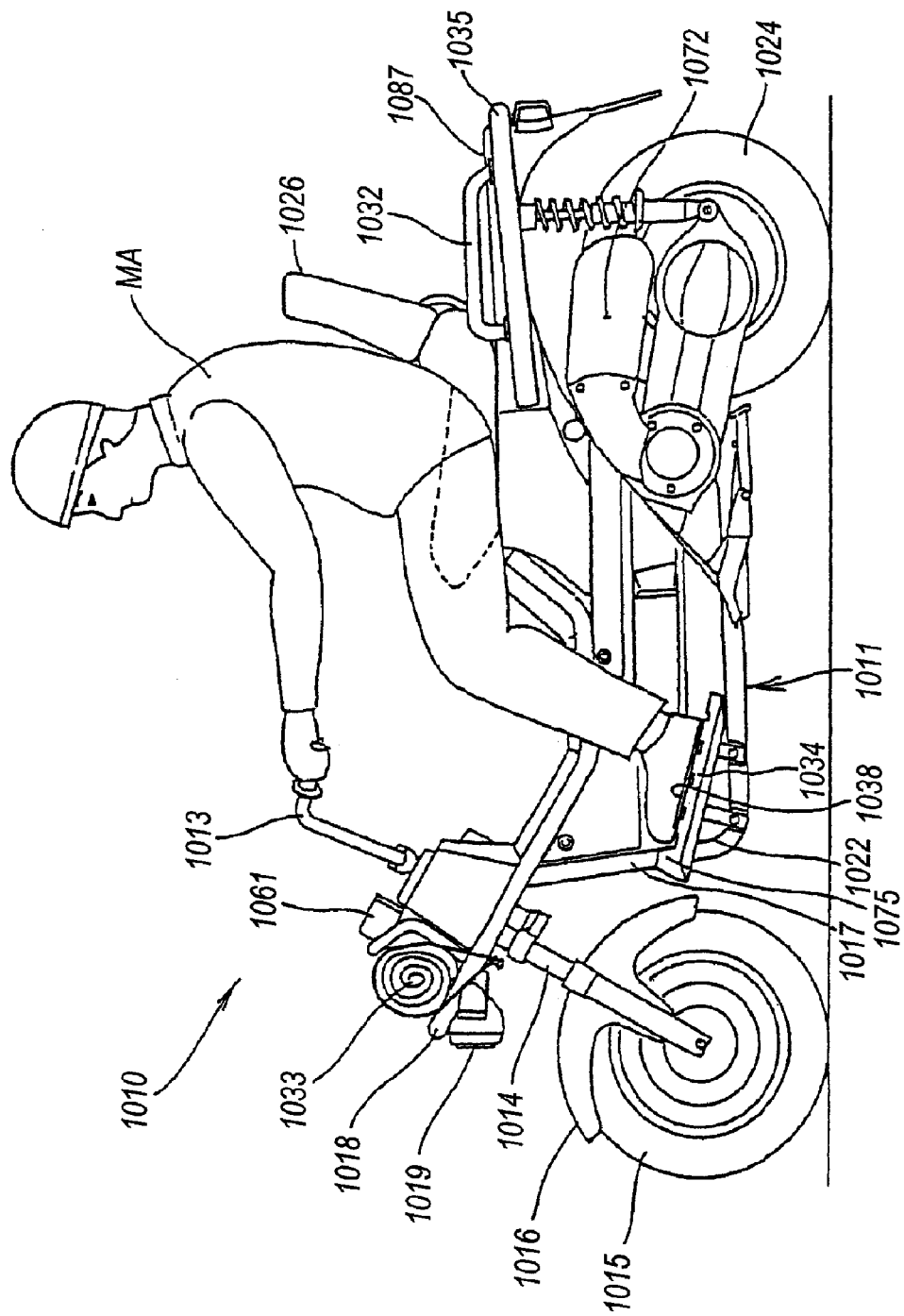
FIG. 24 is a diagram showing an operation when the rider's seat is positioned at a rear end portion of its slidable stroke.
Figure 25:
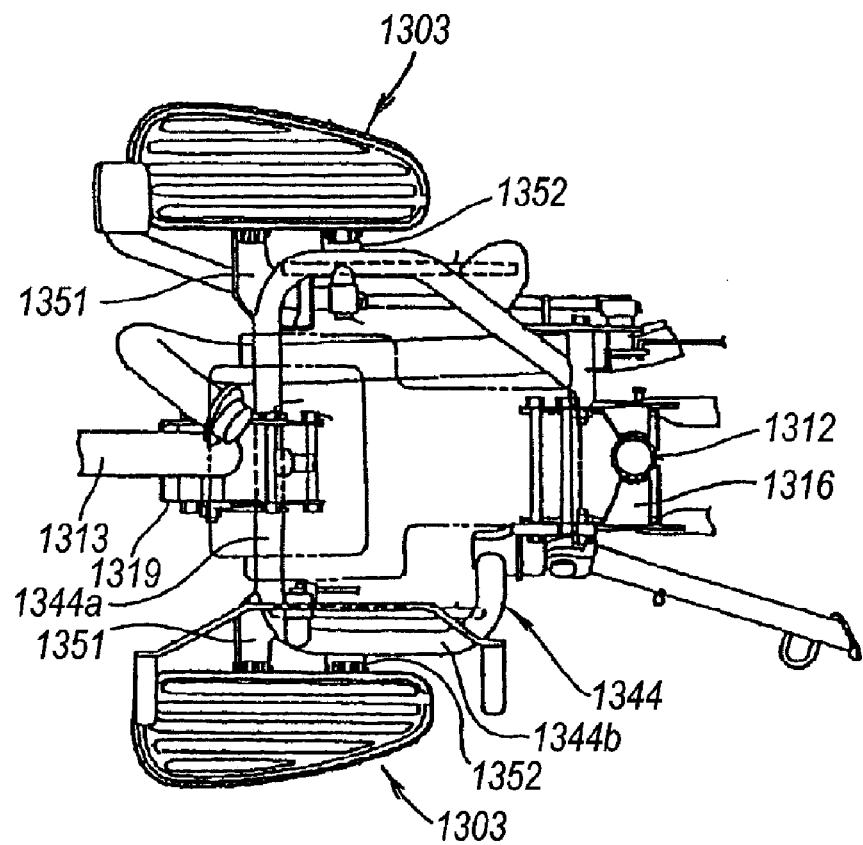
FIG. 25 is an explanatory view showing the basic construction of the conventional art structure.

FIG. 24 is a diagram showing an operation when the rider's seat is positioned at a rear end portion of its slidable stroke.

FIG. 24 shows that, if the rear seat 1026 is raised to the upright position and used as the seat back, even a rider MA having a larger build than the rider shown in FIG. 12 can ride the vehicle even more comfortably by sliding the rider's seat 1025 back to the rear end portion of its slidable stroke.

Since the rider's seat 1025 is slidable in the fore-aft direction of the vehicle, an optimum seat position can be selected to suit the build of the rider and the like.

The condition shown in FIG. 24 differs from that shown in FIG. 12. Referring to FIG. 24, the backside of the foot of the rider MA is planted on the footpeg surface 1038 of the main step 1022. No part of the backside of the foot is placed on the step portion 1075 projecting upwardly at the front end portion 1074 thereof. The foot may be moved according as the rider MA suits, and the tiptoes may be placed on the step portion 1075.

In operation, the main step structure according to the embodiment of the present invention will be described.

Referring back to FIG. 12, the main step 1022 is provided with the step portion 1075 projecting upwardly at the front end portion 1074 thereof. The rider can place part of his or her foot, the tiptoes or the like, on the step portion 1075. The rider thereby can vary his or her riding position during long hours of riding. This allows the rider to take a comfortable riding position.

The main step 1022 is the inclined step having the front portion raised from the level of the rear portion on the footpeg surface 1038. This allows the rider to take an even more comfortable riding position.

The footpeg surface 1038 of the main step 1022 is inclined in such a manner that an extension line 1201 from the footpeg surface 1038 runs a level equivalent to or higher than generally a half of a height H between a lower end portion 1202 of the head pipe 1012 serving as the steering axis and a center 1203 of the front wheel. The rider can therefore take a comfortable position particularly in a vehicle having a small-diameter front wheel. It goes without saying that the extension line 1201 may be pointed toward a level higher than that mentioned in the foregoing.

The combination of the position and angle of disposition of the footpeg surfaces 1038, the step portion 1075 at the leading end portion of the footpeg surfaces 1038 and the forwardly and rearwardly slidable rider's seat 1025 allows the rider or the like to freely vary the riding position. The rider or the like can therefore enjoy an even more comfortable and easy riding.

The vehicle main step structure according to the embodiment of the present invention is applied to a two-wheeled vehicle. The main step structure can nonetheless be applied to a three-wheeled vehicle and even a general vehicle.

The vehicle main step structure according to the embodiment of the present invention is preferably applied to a two-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a vehicle without leg shields comprising:
   main steps, said main steps including footpeg surfaces provided on both sides of said vehicle at a position near a rear portion of a front wheel for positioning the legs of a rider with his/her feet placed on said footpeg surfaces and form an obtuse angle of more than 90° at knees of the rider;
   said main steps being provided with step portions projecting upwardly at front end portions thereof,
   wherein each of the main steps is shaped to be symmetrical about a centerline thereof and each of the footpeg surfaces is trapezoid-shaped with a wider front portion and a narrower rear portion.

2. The vehicle main step structure according to claim 1, wherein each of said main steps is an inclined step having a front portion raised from the level of a rear portion on the footpeg surface.

3. The vehicle main step structure according to claim 1, wherein a rider's seat is slidable in a fore-aft direction of the vehicle.

4. The vehicle main step structure according to claim 1, the vehicle comprising a side cover having an air administration portion on each lateral side of the vehicle, the air administration portions introduction portions bulging outwardly above inner portions of the main steps.

5. The vehicle main step structure according to claim 1, wherein said each of the main steps is formed by placing a plastic cover over a bracket extending from a vehicle body frame.

6. The vehicle main step structure according to claim 1, wherein each of the main steps includes a bracket and a step support stay for connecting the bracket to a right or left lower pipe.

7. The vehicle main step structure according to claim 6, wherein the bracket is removably attached to the corresponding main steps by bolts.

8. The vehicle main step structure according to claim 1, wherein each of the main steps includes a bracket and multiple step support stays for connecting the bracket to a right or left lower pipe.

9. The vehicle main step structure according to claim 8, wherein each of the multiple step support stays has a different length for connecting the corresponding main step to the right or the left lower pipe at an angle that is inclined relative to a forth and aft direction of the vehicle.

10. The vehicle main step structure according to claim 1, wherein the main steps on right and left sides of the vehicle have identical configurations.

11. In a vehicle without leg shields comprising:
main steps, said main steps including footpeg surfaces provided on both sides of said vehicle at a position near a rear portion of a front wheel for positioning the legs of a rider with his/her feet placed on said footpeg surfaces and form an obtuse angle of more than 90° at knees of the rider;
said main steps being provided with step portions projecting upwardly at front end portions thereof,
wherein each of said main steps is formed by placing a plastic cover over a bracket extending from a vehicle body frames,
the vehicle further comprising a side cover having an air administration portion on each lateral side of the vehicle, the air administration portions bulging outwardly above inner portions of the main steps.

12. The vehicle main step structure according to claim 11, wherein each of said main step is an inclined step having a front portion raised from the level of a rear portion on the footpeg surface.

13. The vehicle main step structure according to claim 11, wherein a rider's seat is slidable in a fore-aft direction of the vehicle.

14. The vehicle main step structure according to claim 11, wherein each of said main steps is shaped to be symmetrical about a centerline thereof and each of the footpeg surfaces is shaped like a trapezoid with a wider front portion and a narrower rear portion.

15. The vehicle main step structure according to claim 11, wherein each of the main steps includes a bracket and a step support stay for connecting the bracket to a right or left lower pipe.

16. The vehicle main step structure according to claim 15, wherein the bracket is removably attached to the corresponding main steps by bolts.

17. The vehicle main step structure according to claim 11, wherein each of the main steps includes a bracket and multiple step support stays for connecting the bracket to a right or left lower pipe.

18. The vehicle main step structure according to claim 17, wherein each of the multiple step support stays has a different length for connecting the corresponding main step to the right or the left lower pipe at an angle that is inclined relative to a forth and aft direction of the vehicle.

19. The vehicle main step structure according to claim 11, wherein the main steps on right and left sides of the vehicle have identical configurations.

* * * * *